(12) United States Patent
Onuki et al.

(10) Patent No.: US 9,167,148 B2
(45) Date of Patent: Oct. 20, 2015

(54) IMAGE CAPTURE APPARATUS THAT PERFORMS FOCUS DETECTION WITH A PHASE DIFFERENCE DETECTION METHOD

(71) Applicant: CANON KABUSHIKI KAISHA, Tokyo (JP)

(72) Inventors: Ichiro Onuki, Kawasaki (JP); Akihiro Nishio, Yokohama (JP); Koichi Fukuda, Tokyo (JP); Yoshihito Tamaki, Yokohama (JP); Yuki Yoshimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 53 days.

(21) Appl. No.: 13/777,444

(22) Filed: Feb. 26, 2013

(65) Prior Publication Data
US 2013/0235253 A1  Sep. 12, 2013

(30) Foreign Application Priority Data
Mar. 6, 2012  (JP) ................................. 2012-049718

(51) Int. Cl.
*H04N 5/232*  (2006.01)
*H04N 5/369*  (2011.01)

(52) U.S. Cl.
CPC ......... *H04N 5/23212* (2013.01); *H04N 5/3696* (2013.01)

(58) Field of Classification Search
None
See application file for complete search history.

(56) References Cited

U.S. PATENT DOCUMENTS

| 2007/0121212 | A1* | 5/2007 | Boettiger et al. ............. 359/619 |
| 2011/0164166 | A1* | 7/2011 | Oikawa ......................... 348/340 |
| 2012/0099006 | A1* | 4/2012 | Matsuo et al. ................ 348/241 |

FOREIGN PATENT DOCUMENTS

| JP | 58-087512 | 5/1983 |
| JP | 62-189415 | 8/1987 |
| JP | 09-046596 | 2/1997 |
| JP | 11-218764 | 8/1999 |
| JP | 2001-305415 | 10/2001 |
| JP | 2006-345254 | 12/2006 |

\* cited by examiner

*Primary Examiner* — Twyler Haskins
*Assistant Examiner* — Angel L Garces-Rivera
(74) *Attorney, Agent, or Firm* — Cowan, Liebowitz & Latman, P.C.

(57) ABSTRACT

An image capture apparatus includes: an image sensor having a plurality of pixels that photoelectrically convert an object image formed by an imaging optical system, each of the pixels having one microlens and a photoelectric conversion portion that has been divided into a plurality of portions; a focus detection unit configured to correct an image shift amount detected with a phase difference detection method using focus detection signal arrays of two images obtained by the photoelectric conversion portions divided into a plurality of portions; and a controller that calculates information corresponding to a movement amount of a lens of the imaging optical system based on the image shift amount detected and corrected by the focus detection unit, and controls movement of the lens of the imaging optical system.

18 Claims, 16 Drawing Sheets

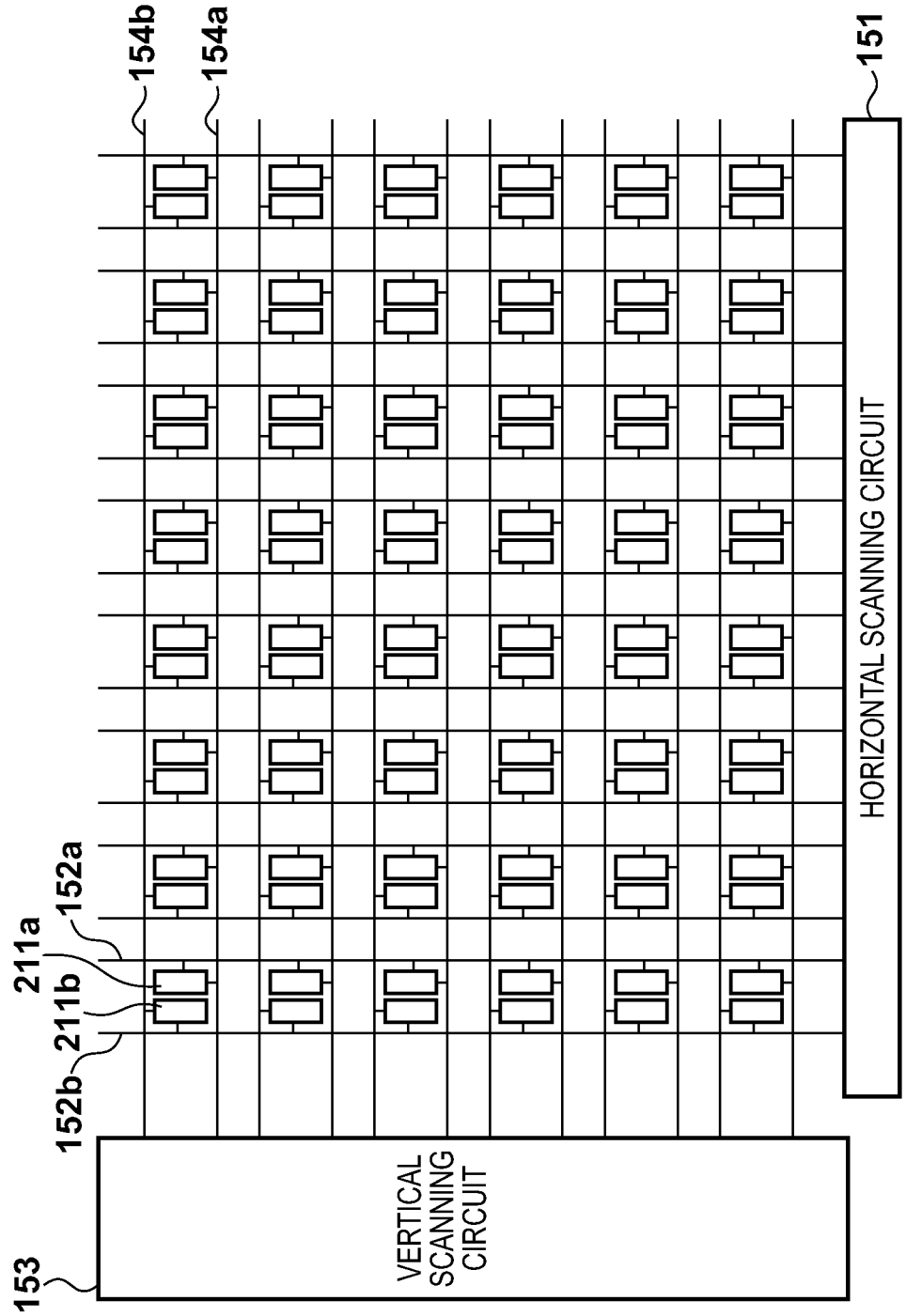

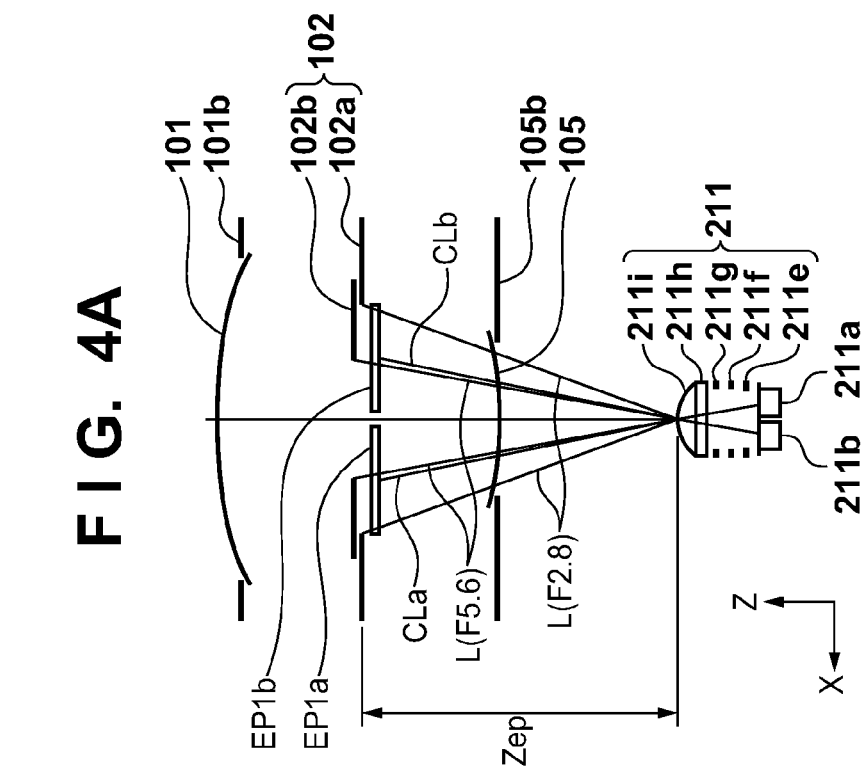
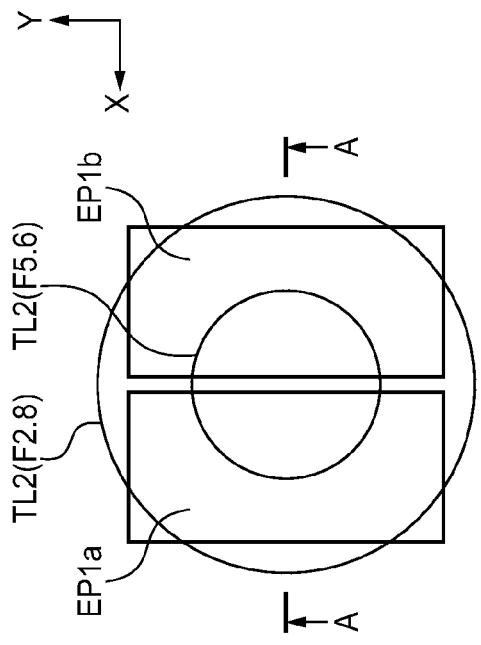
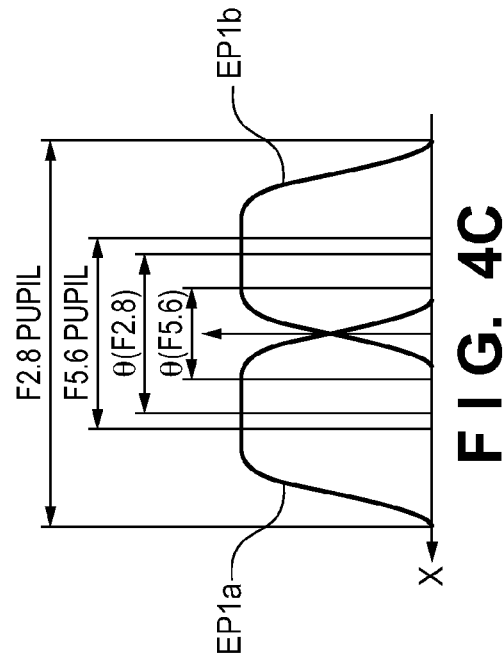

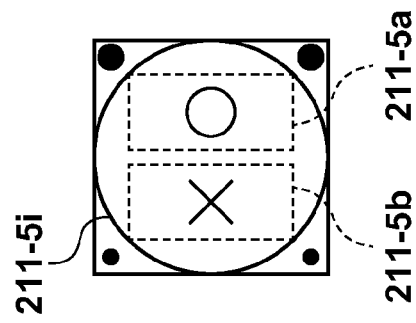
FIG. 7E
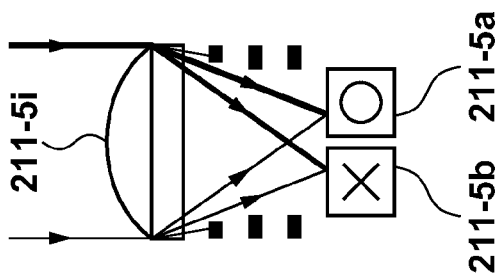
FIG. 7D
FIG. 7C
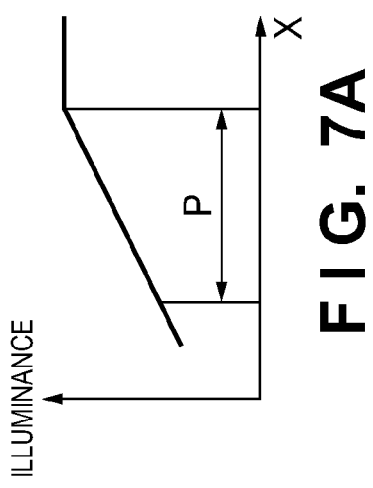
FIG. 7A
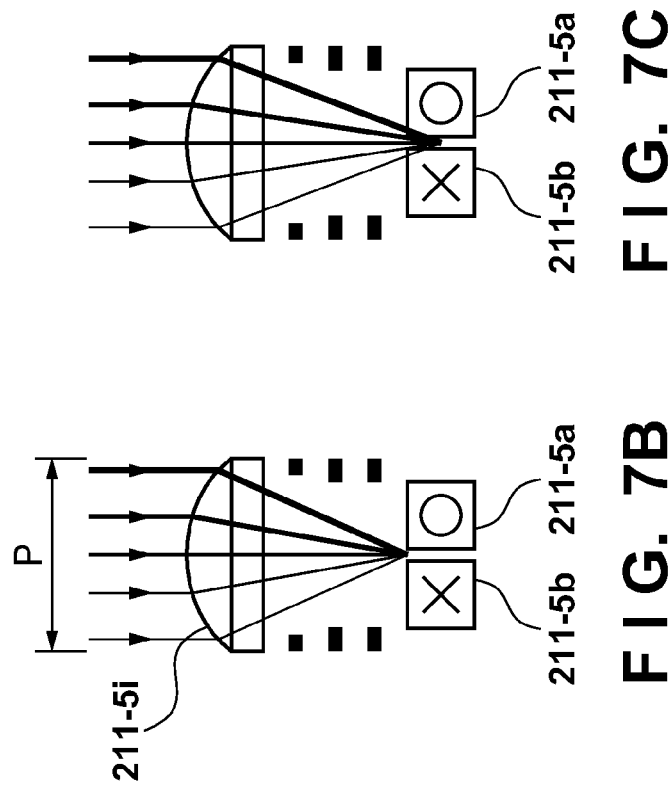
FIG. 7B

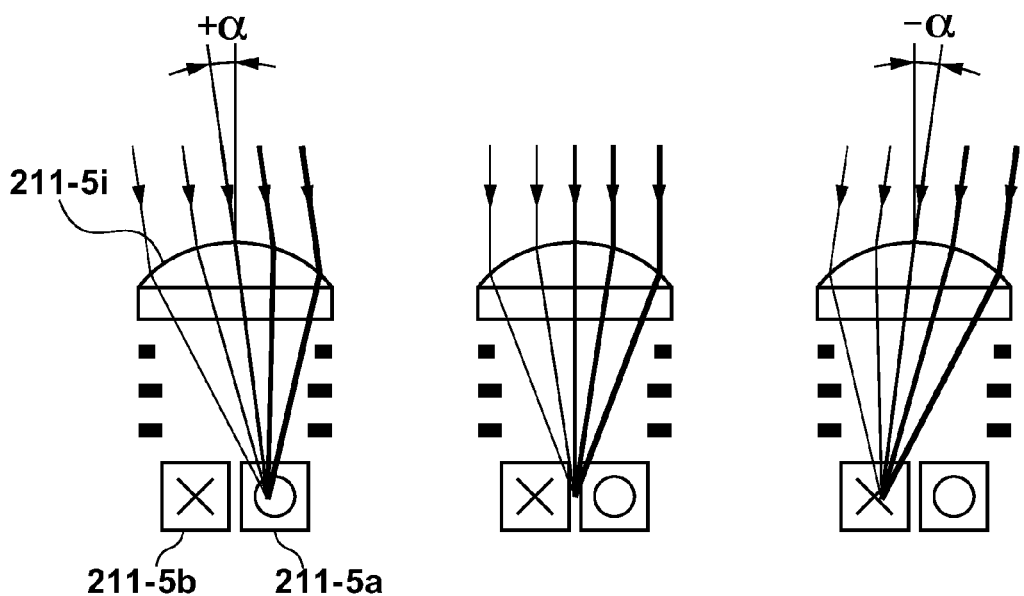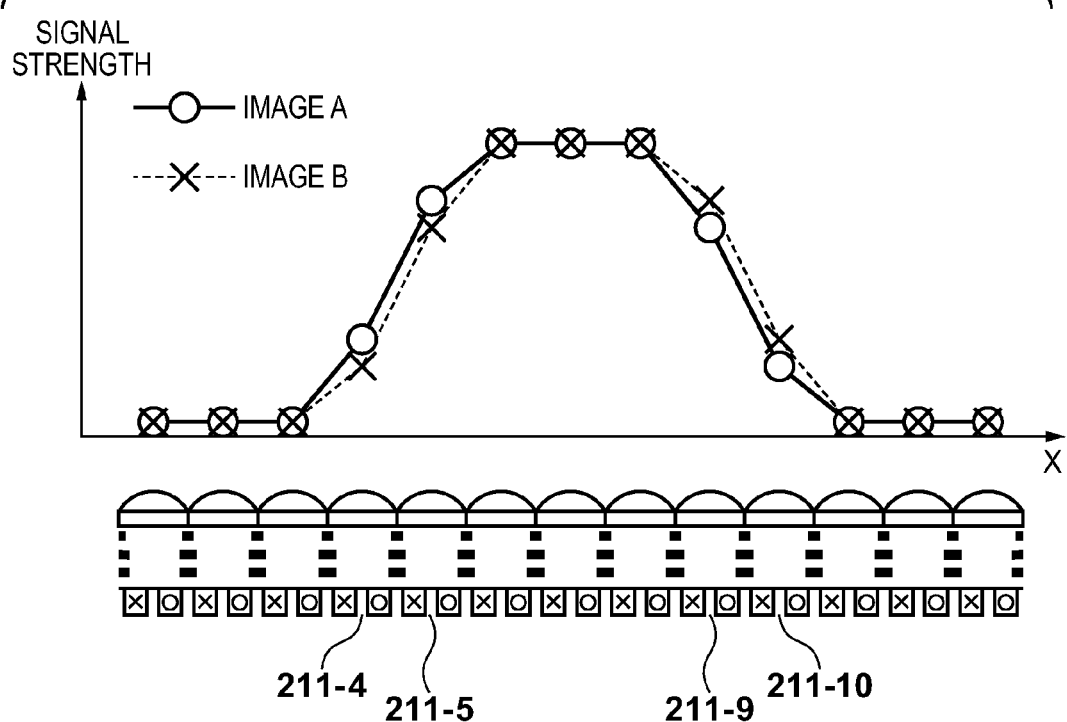

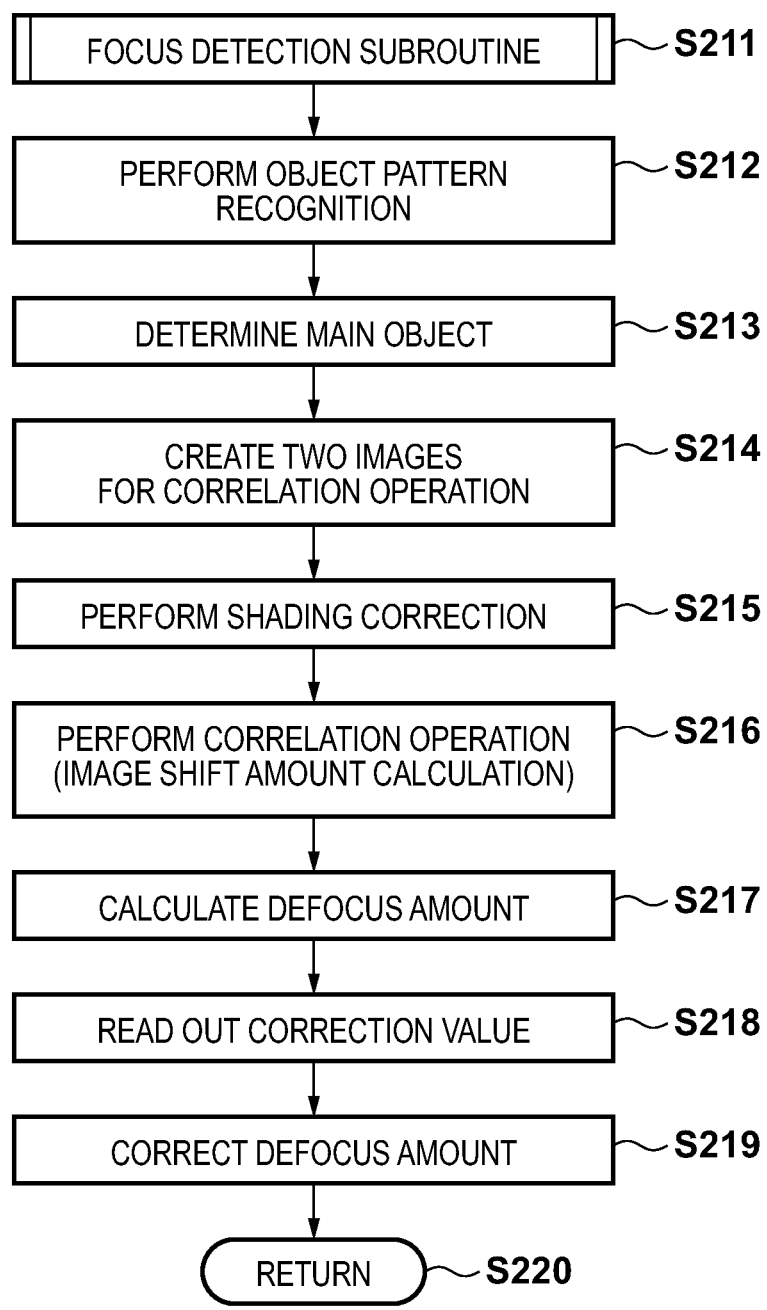
F I G. 15

IMAGE CAPTURE APPARATUS THAT PERFORMS FOCUS DETECTION WITH A PHASE DIFFERENCE DETECTION METHOD

BACKGROUND OF THE INVENTION

1. Field of the Invention

The present invention relates to an image capture apparatus that performs focus detection with a phase difference detection method using an image sensor in which image forming pixels and focus detecting pixels are arranged on an image sensing plane.

2. Description of the Related Art

Technology has been proposed for performing high-speed and high-precision focus detection using a phase-difference focus detection means in an image capture apparatus that has an imaging optical system and an image sensor. In phase-difference focus detection technology, luminous flux that exits the imaging optical system is divided into at least two areas by a pupil division means, and a pair of focus detection signal arrays of two images are obtained by photoelectrically converting the luminous flux in the areas. A so-called defocus amount, which is the amount of defocus of a predicted focal plane, is detected based the amount of relative image shift between the two signal arrays.

If the imaging optical system is in an optically in-focus state, the amount of relative image shift between the two signal arrays will ideally be zero. However, due to offset (misalignment in the optical axis direction) in the spatial arrangement of the focus detection means, optical aberration of the imaging optical system, and problems unique to the photoelectric conversion element for focus detection, there are cases where the amount of image shift between two images is not zero even when in the in-focus state. In such cases, focus detection error arises if the detected image shift amount is converted into the defocus amount as is. Accordingly, technology for resolving such error has also been proposed.

For example, Japanese Patent Laid-Open No. 58-87512 proposes the following technology. Specifically, a focus detection means is arranged at a position that is separated from the optical axis direction by a predetermined amount relative to the predicted focal plane of the imaging optical system, thus lowering the spatial frequency of the focus detection images and reducing error that arises during sampling of the photoelectric conversion element. In this case, a predetermined amount of image shift occurs between two signal arrays even in the in-focus state. In view of this, a correct focus detection result is obtained by calculating the defocus amount after subtracting the predetermined initial shift amount from the calculated image shift amount between two images.

Also, Japanese Patent Laid-Open No. 62-189415 and Japanese Patent Laid-Open No. 11-218764 disclose technology for correcting focus detection error that arises due to spherical aberration of the imaging optical system and the like. With the phase-difference focus detection methods in these two prior art documents, only a portion of luminous flux that exits the imaging optical system is used in focus detection. This results in deviation between the focal position at which imaging performance is the best and the focal position calculated based on focus detection signals. In view of this, methods for correcting the amount of such deviation are disclosed in these prior art documents.

Technology has also been proposed for using a two-dimensional CMOS sensor or the like as the imaging means and providing pixels with a phase-difference focus detection function (Japanese Patent Laid-Open No. 2001-305415). Both image forming pixels and focus detecting pixels are used in this technology. Specifically, the image forming pixels and the focus detecting pixels are arranged on the same plane, and therefore when the image forming pixels are in the in-focus state, the focus detecting pixels are also in the in-focus state. Accordingly, relative image shift does not occur in principle between two images for phase difference detection when focusing is performed. However, since pupil division is performed with very small microlenses and photoelectric conversion portions in this technology, there are cases where luminous flux is scattered in pixels and electrical crosstalk occurs between photoelectric conversion portions. Accordingly, even when in the in-focus state, there are cases where the image shift amount between two images is not zero, but rather predetermined image shift error arises. Since this image shift error arises due to individual pixel characteristics, it is difficult to resolve with the methods disclosed in the aforementioned prior art documents.

For example, since the correction of image shift between two images in Japanese Patent Laid-Open No. 58-87512 is the correction of spatial misalignment between the predicted imaging plane and the focus detection means, even if the F-number of the imaging optical system is changed, for example, there is no change in the correction amount in the defocus amount conversion.

Also, the error in Japanese Patent Laid-Open No. 62-189415 and Japanese Patent Laid-Open No. 11-218764 is caused by optical aberration of the imaging optical system. Since optical aberration normally decreases as the F-number of the imaging optical system increases, the amount of error in the defocus amount conversion decreases according to increase in the F-number.

SUMMARY OF THE INVENTION

The present invention has been achieved in light of the above-described problems, and enables high-precision correction of focus detection error when performing focus detection with a phase difference detection method using an image sensor in which image forming pixels and focus detecting pixels are arranged on an image sensing plane.

An image capture apparatus according to the present invention includes: an image sensor having a plurality of pixels that photoelectrically convert an object image formed by an imaging optical system, each of the pixels having one microlens and a photoelectric conversion portion that has been divided into a plurality of portions; a focus detection unit configured to correct an image shift amount detected with a phase difference detection method using focus detection signal arrays of two images obtained by the photoelectric conversion portions divided into a plurality of portions; and a controller that calculates information corresponding to a movement amount of a lens of the imaging optical system based on the image shift amount detected and corrected by the focus detection unit, and controls movement of the lens of the imaging optical system.

Further features of the present invention will become apparent from the following description of exemplary embodiments with reference to the attached drawings.

BRIEF DESCRIPTION OF THE DRAWINGS

FIG. 3 is a circuit diagram of the image sensor according to the first embodiment.

FIGS. 4A to 4C are diagrams illustrating a projection relationship between an imaging optical system and the image sensor.

FIGS. 7A to 7E are diagrams illustrating the behavior of luminous flux in a pixel.

FIGS. 8A to 8C are diagrams illustrating the influence of the incidence angle of luminous flux that enters a pixel.

FIG. 9 is a diagram illustrating change in the signal strength of a pixel group.

FIG. 15 is a flowchart of a focus detection subroutine according to a second embodiment.

DESCRIPTION OF THE EMBODIMENTS

Hereinafter, embodiments of the present invention will be described in detail with reference to the drawings.

First Embodiment

Figure 1:
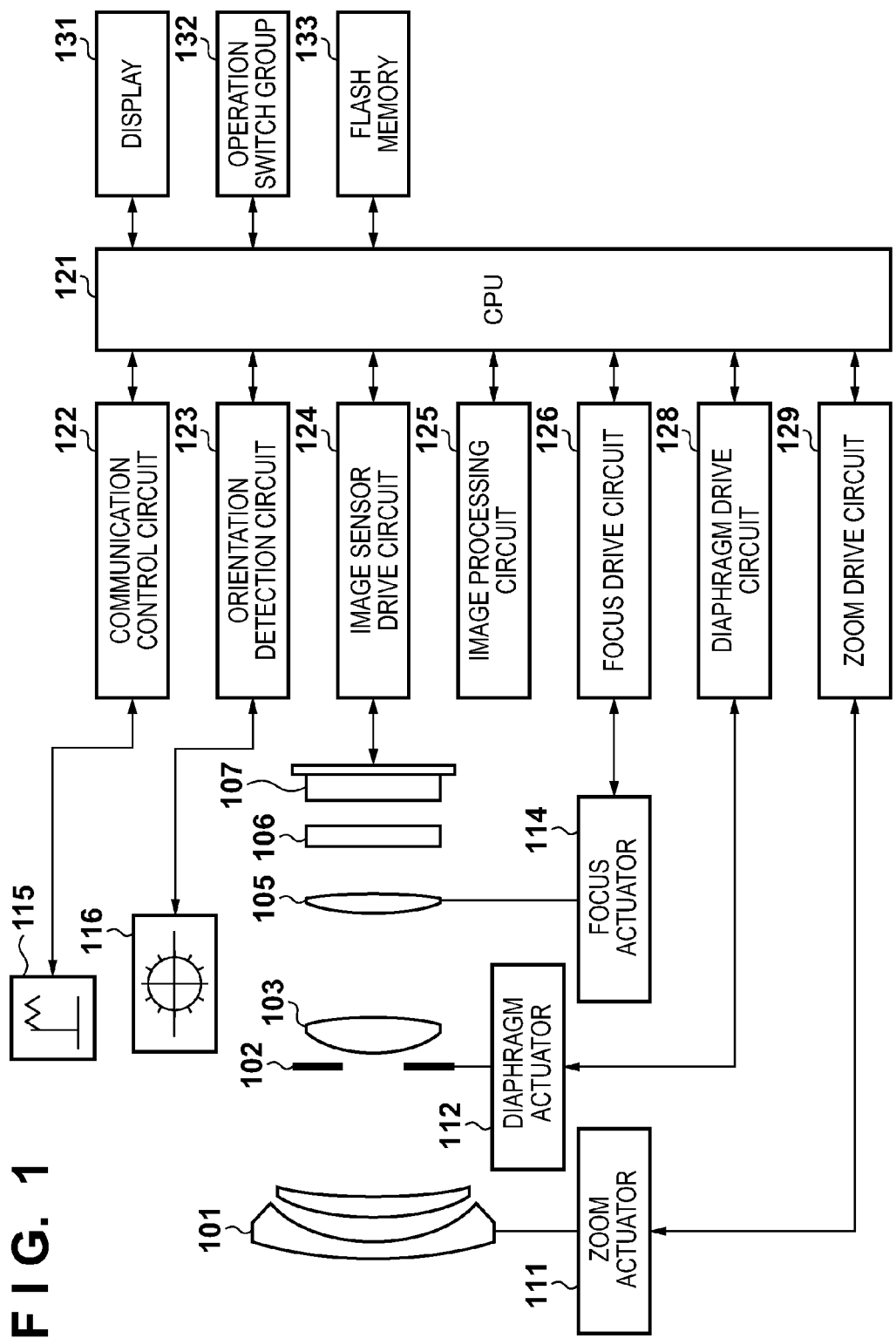
FIG. 1 is a diagram showing a configuration of an image capture apparatus according to a first embodiment of the present invention.

FIG. 1 is a diagram showing a configuration of an image capture apparatus according to a first embodiment of the present invention. The image capture apparatus of the present embodiment is an electronic camera in which an imaging optical system and a camera body that has an image sensor are integrated, and the image capture apparatus can record moving images and still images. In FIG. 1, reference sign 101 denotes a first lens group that is arranged at the front of the imaging optical system (image forming optical system) and is held so as to be capable of moving in the optical axis direction. Reference sign 102 denotes a diaphragm whose opening diameter is adjusted so as to make it possible to adjust the F-number of the imaging optical system and adjust the amount of light during imaging, and also functions as a shutter for adjusting the exposure time during still image capturing. Reference sign 103 denotes a second lens group. The diaphragm 102 and the second lens group 103 are driven integrally in the optical axis direction and work in cooperation with a moving operation of the first lens group 101 so as to achieve a magnification effect (zoom function).

Reference sign 105 denotes a third lens group that adjusts the focus by moving in the optical axis direction. Reference sign 106 denotes an optical low-pass filter, which is an optical element for reducing false color and moiré in captured images. Reference sign 107 denotes an image sensor configured by a C-MOS sensor and peripheral circuitry. The image sensor 107 is a two-dimensional single-plate color sensor in which light receiving pixels are arranged in an array with M pixels horizontally and N pixels vertically, on which a primary-color color mosaic filter with the Bayer pattern is formed on-chip.

Reference sign 111 denotes a zoom actuator that performs a magnification operation by driving at least either the first lens group 101 or the third lens group 105 in the optical axis direction due to a cam barrel (not shown) being rotated manually or by an actuator. Reference sign 112 denotes a diaphragm actuator that controls the opening diameter of the diaphragm 102 so as to adjust the amount of light in imaging, and also controls the exposure time during still image capturing. Reference sign 114 denotes a focus actuator that adjusts the focus by driving the third lens group 105 in the optical axis direction.

Reference sign 115 denotes a wireless communication unit configured by a signal processing circuit and an antenna for communicating with a server computer via a network such as the Internet. Reference sign 116 denotes a camera orientation detection unit, which is an electronic level for identifying the camera imaging orientation, that is to say, whether horizontal imaging or vertical imaging is being performed.

Reference sign 121 denotes a CPU that has an arithmetic portion, a ROM, a RAM, an A/D converter, a D/A converter, a communication interface circuit, and the like in order to perform various types of control on the camera body. Various circuits of the camera are driven based on a predetermined program stored in the ROM so as to execute a series of operations such as focus adjustment (AF), imaging, image processing, and recording.

Reference sign 122 denotes a communication control circuit that, via the communication unit 115, transmits captured images from the camera to the server computer and receives images and various types of information from the server computer. Reference sign 123 denotes an orientation detection circuit that identifies the orientation of the camera based on an output signal from the orientation detection unit 116. Reference sign 124 denotes an image sensor drive circuit that controls imaging operations performed by the image sensor 107, as well as subjects an acquired image signal to A/D conversion and transmits the converted image signal to the CPU 121. Reference sign 125 denotes an image processing circuit that performs color interpolation, Yconversion, image compression, and the like on images acquired by the image sensor 107.

Reference sign 126 denotes a focus drive circuit that controls driving of the focus actuator 114 based on a focus detection result, and performs focus adjustment by driving the third lens group 105 in the optical axis direction. Reference sign 128 denotes a diaphragm drive circuit that controls the opening of the diaphragm 102 by controlling the driving of the diaphragm actuator 112. Reference sign 129 denotes a zoom drive circuit that drives the zoom actuator 111 according to a zoom operation performed by the photographer.

Reference sign 131 denotes a display such as an LCD, and this display displays information regarding the shooting mode of the camera, a preview image in imaging, an image for checking after imaging, an image displaying the focus state in focus detection, camera orientation information, and the like. Reference sign 132 denotes an operation switch group configured by a power switch, an imaging start switch, a zoom operation switch, a shooting mode selection switch, and the like. Reference sign 133 denotes a removable flash memory that records captured images (including moving images and still images) and a later-described defocus map.

Figure 2:
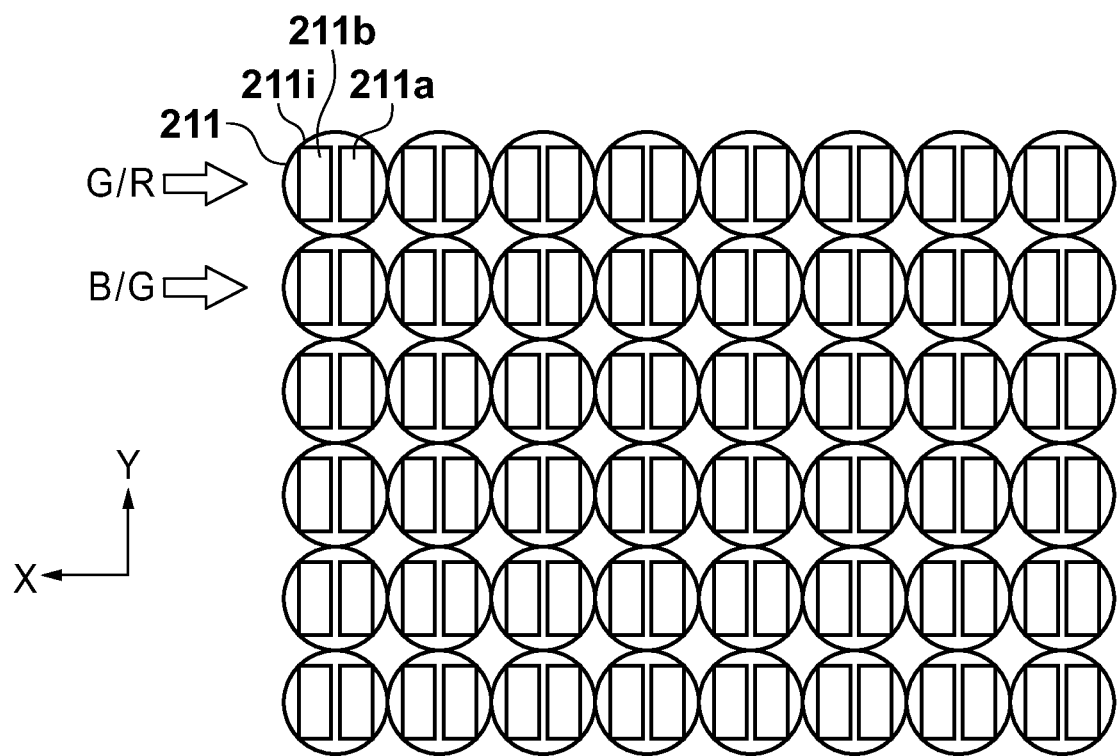
FIG. 2 is a diagram showing a pixel arrangement of an image sensor according to the first embodiment.

FIG. 2 is a diagram showing the pixel arrangement of the image sensor of the first embodiment, and in this figure, the range of six rows vertically (Y direction) and eight columns horizontally (X direction) of the two-dimensional C-MOS area sensor is shown as observed from the imaging optical system side. According to the Bayer pattern applied to the color filter, green and red color filters are alternately provided in order from the left in pixels in odd-numbered rows. Blue and green color filters are alternately provided in order from the left in pixels in even-numbered rows. Circles 211*i* denote on-chip microlenses that are provided one for each pixel. The rectangles arranged inside the on-chip microlenses denote photoelectric conversion portions.

In the configuration of the present embodiment, the photoelectric conversion portion is divided into two portions in the X direction in all of the pixels, and photoelectric conversion signals can be read out independently from each of the divided areas. The signals that are read out independently are used in phase-difference focus detection performed using a later-described method, and can also be used to generate a 3D (3-Dimensional) image configured from multiple images that have parallax information. Information obtained by adding up the output of the divided photoelectric conversion portions can also be used as normal captured images.

The following describes pixel signals in the case of performing phase-difference focus detection. As will be described later, in the present embodiment, the microlenses 211*i* in FIG. 2 and divided photoelectric conversion portions 211*a* and 211*b* perform pupil division so as to divide luminous flux exiting the imaging optical system. Output from the photoelectric conversion portions 211*a* in multiple pixels 211 arranged in a predetermined range in the same row is stitched together so as to form an AF image A (focus detection signal array), and output from the photoelectric conversion portions 211*b* in the same pixels 211 are likewise stitched together to form an AF image B (focus detection signal array). A phase difference detection method can then be used to detect the amount of defocus, i.e. defocus amount (focus detection value), in a predetermined area by using a correlation operation to detect the amount of relative image shift between the thus-generated AF images A and B.

Since the above-described image sensor can be manufactured using the technology disclosed in Japanese Patent Laid-Open No. 09-046596 by the same applicant as the present application, a detailed description of the structure of the image sensor will not be given.

FIG. 3 shows a configuration of a readout circuit in the image sensor of the present embodiment. Reference sign 151 denotes a horizontal scanning circuit, and reference sign 153 denotes a vertical scanning circuit. Horizontal scanning lines 152*a* and 152*b* and vertical scanning lines 154*a* and 154*b* are provided at boundary portions of the pixels, and signals from the photoelectric conversion portions are read out to the outside via these scanning lines.

Note that the image sensor of the present embodiment has the following two types of readout modes. The first readout mode is called the all-pixel readout mode, and is a mode for capturing a high-resolution still image. In this case, signals are read out from all of the pixels. The second readout mode is called the thin-out readout mode, and is a mode for performing moving image recording or only the display of preview images. The number of pixels needed in this case is smaller than the total number of pixels, and therefore signals are read out from only pixels remaining after thinning out the pixel group by a predetermined ratio in both the X direction and the Y direction.

FIGS. 4A to 4C are diagrams illustrating the conjugate relationship between the exit pupil plane of the imaging optical system and the photoelectric conversion portions of the image sensor in the image capture apparatus of the present embodiment, the image sensor being arranged at the image height of zero, that is to say, in the vicinity of the center of the image plane. The photoelectric conversion portions in the image sensor and the exit pupil plane of the imaging optical system are provided so as to be in a conjugate relationship due to the on-chip microlenses. Normally, the exit pupil of the imaging optical system substantially conforms to the face where the iris diaphragm for light amount adjustment is disposed. On the other hand, the imaging optical system of the present embodiment is a zoom lens that has a magnification function, and depending on the type of optics, the size of the exit pupil and its distance from the image plane change when a magnification operation is performed. In the imaging optical system in FIGS. 4A to 4C, the focal length is between the wide-angle end and the telephoto end, that is to say, the middle state. Assuming this length to be the standard exit pupil length Zep, the shape of the on-chip microlenses and the eccentricity parameter corresponding to the image height (X,Y coordinate) are designed so as to be optimal.

In FIG. 4A, reference sign 101 denotes the first lens group, reference sign 101*b* denotes a lens tube member that holds the first lens group, reference sign 105 denotes the third lens group, and reference sign 105*b* denotes a lens tube member that holds the third lens group. Reference sign 102 denotes the diaphragm, reference sign 102*a* denotes an opening plate that defines the opening diameter when the diaphragm is released, and reference sign 102*b* denotes diaphragm blades for adjusting the opening diameter when narrowing the opening of the diaphragm. Note that the members 101*b*, 102*a*, 102*b*, and 105*b* that act as members for restricting the luminous flux that passes through the imaging optical system exhibit an optical virtual image when observed from the image plane. Also, the synthetic aperture in the vicinity of the diaphragm 102 is defined as the exit pupil of the lens, and the distance from the image plane is Zep as previously described.

Reference sign 211 denotes a pixel for performing photoelectric conversion on an object image, and this pixel is configured by members including, from the bottom layer, the photoelectric conversion portions 211*a* and 211*b*, wiring layers 211*e* to 211*g*, a color filter 211*h*, and a on-chip microlens 211*i*. The two photoelectric conversion portions are projected on the exit pupil plane of the imaging optical system by the on-chip microlens 211*i*. In other words, the exit pupil of the imaging optical system is projected onto the surface of the photoelectric conversion portions via the on-chip microlens 211*i*.

FIG. 4B shows projected images of the photoelectric conversion portions on the exit pupil plane of the imaging optical system, and reference signs EP1*a* and EP1*b* respectively denote the projected images of the photoelectric conversion portions 211*a* and 211*b*. Here, if the diaphragm 102 is released (e.g., F2.8), the outermost portion of the luminous flux that passes through the imaging optical system is denoted by L (F2.8), and the projected images EP1*a* and EP1*b* are not clipped by the diaphragm opening. However, if the opening of the diaphragm 102 is narrowed (e.g., F5.6), the outermost portion of the luminous flux that passes through the imaging optical system is denoted by L (F5.6), and the outer sides of the projected images EP1*a* and EP1*b* are clipped by the diaphragm opening. It should be noted that in the center of the image plane, the clipping of the projected images EP1*a* and EP1b is symmetric about the optical axis, and the amounts of light received by the photoelectric conversion portions 211a and 211b are the same.

FIG. 4C shows light reception characteristics at a cross-section taken along A-A in FIG. 4B, where the horizontal axis represents horizontal coordinates on the exit pupil plane of the imaging optical system, and the vertical axis represents the light reception efficiency of the photoelectric conversion portions. FIG. 4A shows that the photoelectric conversion portions arranged in the pixel are in a conjugate relationship with the exit pupil of the imaging optical system due to the on-chip microlens. This means that only luminous flux that passes through an area common to the projected image EP of a photoelectric conversion portion and the exit pupil TL of the imaging optical system on the exit pupil plane arrives at the photoelectric conversion portion. Accordingly, the projected image corresponds to the aperture diaphragm unique to the pixels arranged on the exit pupil plane of the imaging optical system, and the vertical axis in FIG. 4C represents a transmittance distribution of aperture diaphragms. This transmittance distribution can be considered to indicate the luminous flux light reception efficiency of the photoelectric conversion portion. The distribution characteristics of the luminous flux light reception efficiency are hereinafter referred to as the "pupil intensity distribution" for the sake of convenience.

Here, if the projection performance of the on-chip microlens is aplanatic in terms of geometrical optics, the pupil intensity distribution is a step function that has a value of only either 0 or 1. However, since the dimensions of each pixel are very small at approximately several μm, the image of the photoelectric conversion portion projected on the exit pupil plane decreases in sharpness due to the diffraction of light. Also, since the on-chip microlens is normally a spherical lens, the projected image decreases in sharpness due to spherical aberration as well. In view of this, defocus occurs in the pupil intensity distribution of the pixels as well, and the shoulder portions on both ends are rounded and flare out at the bottom as shown in FIG. 4C.

Next, the relationship between the pupil intensity distribution and focus detection characteristics will be described. In one pair of pupil intensity distributions in the X axis direction, the amount of separation between the barycentric centers of the portions clipped out by the exit pupil ranges of the imaging optical system corresponds to the base length in the phase-difference focus detection system. Here, the base length is defined by the angle θ (in units of radians) obtained by dividing the barycentric separation amount (in units of mm) on the pupil plane of the imaging optical system by the pupil length (in units of mm). Letting u (in units of mm) represent the image shift amount between two images in focus detection, and dz (in units of mm) represent the defocus amount at that time, the relationship therebetween is expressed by Expression (1) below.

$$\theta \times dz = u \quad (1)$$

$$dz = u \times (1/\theta) = u \times K1 \quad (2)$$

Here, K1 is a coefficient defined by the inverse of the base angle θ.

Here, θ has a different value for each F-number of the imaging optical system, and the base angles for F2.8 and F5.6 are indicated by θ(F2.8) and θ(F5.6) in FIGS. 4A to 4C. According to Expression (1), the greater the base angle θ is, the greater the amount of image shift between focus detection images for a unit of defocus amount is, and the higher the focus detection precision is. On the other hand, since the image shift amount between a pair of images rises when the amount of defocus is high, the highest defocus amount at which focus detection is possible decreases when the focus detection area is small.

Also, if the spread of the pupil intensity distribution in the X direction is high, the amount of light received by the photoelectric conversion portions increases, there is little noise in the case of use as an image signal, and the low-brightness detection limit improves in the case of use as a focus detection signal. On the other hand, the amount of image defocus also increases, and the highest defocus amount at which focus detection is possible decreases due to a reduction in the contrast of the focus detection signal.

Figure 5:
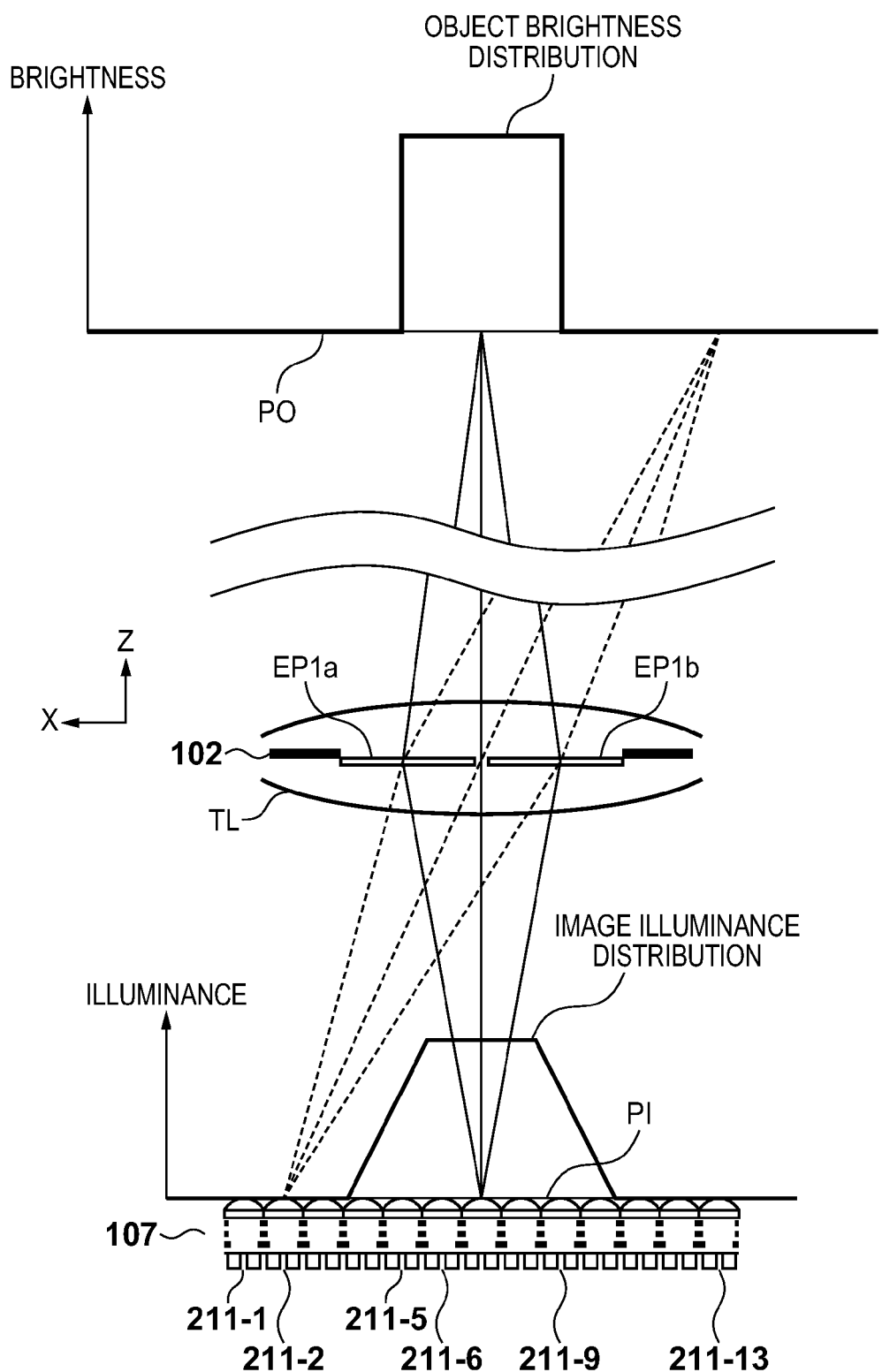
FIG. 5 is a diagram illustrating a relationship between an object and an image during focusing.

FIG. 5 is a diagram illustrating the relationship between an object and an image during focusing. Here, TL denotes a simplification of the imaging optical system, reference sign 102 denotes the diaphragm, and EP1a and EP1b denote projected images of the photoelectric conversion portions of the pixels 211. Reference signs 211-1 to 211-13 denote a group of pixels arranged in the central portion of the imaging area of the image sensor 107. Also, PO denotes the object plane, which is the plane at which the object having the brightness distribution is disposed as shown in the figure. The object has, for example, a vertical stripe pattern in which one white line is drawn on a black background, that is to say, has a stepwise change in brightness in the X axis direction, has no change in brightness in the Y axis direction. PI denotes the image plane, that is to say, the entrance plane of the pixels 211 that configure the image sensor 107, and this image plane technically corresponds to the entrance pupil plane of the microlenses.

In FIG. 5, the positions of the focusing lenses of the imaging optical system have been adjusted such that the object plane PO and the image plane PI are conjugate with each other, that is to say, the object in the object plane is in focus on the image plane. Here, if the imaging optical system TL is an aplanatic lens, the illuminance distribution of the object is similar to the brightness distribution of the object, that is to say, is stepped. However, if the imaging optical system TL has various optical aberrations such as spherical aberration or chromatic aberration, a high frequency component of the image is lost. Also, point image spreading also occurs due to the diffraction of light. Accordingly, the illuminance distribution of the actual object has rounding at the edge portions, which is expressed by being modeled to a trapezoid shape as shown in the figure.

Figure 6:
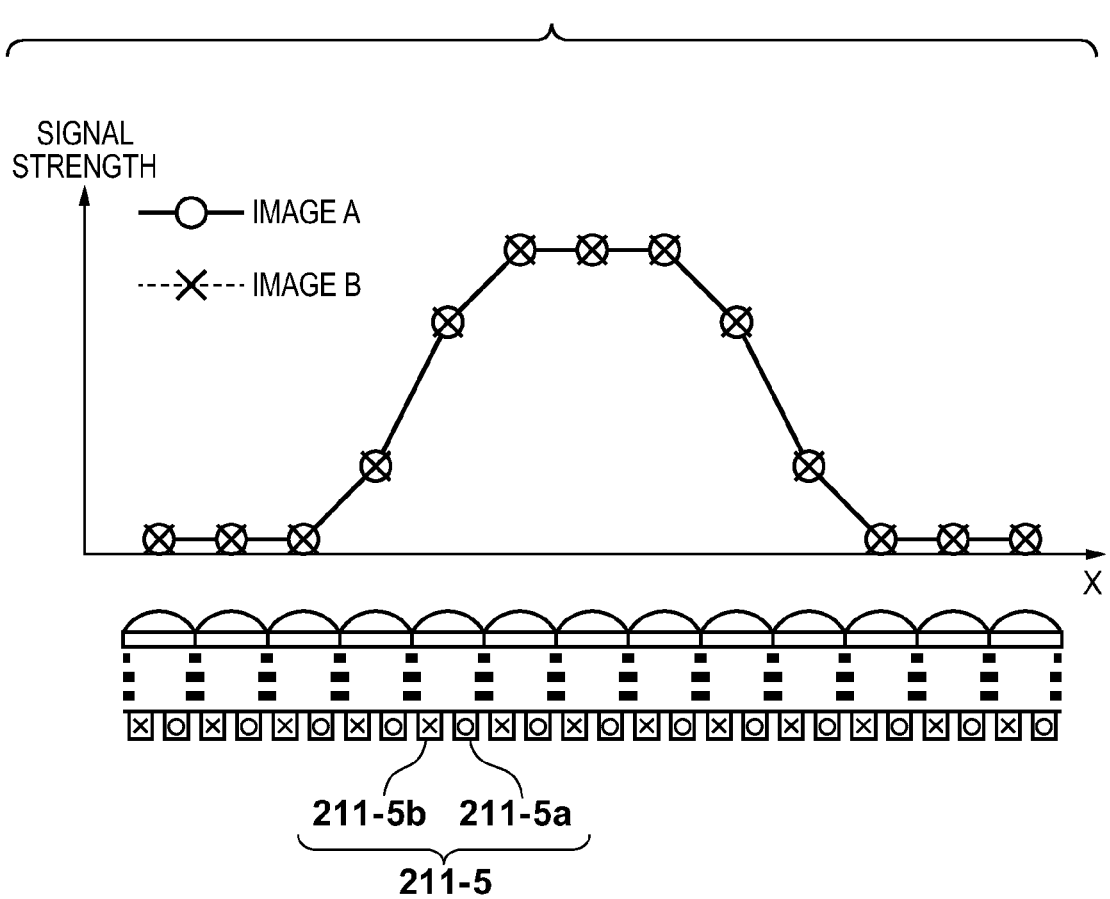
FIG. 6 is a diagram illustrating signal waveforms of a pixel group.

FIG. 6 is a diagram showing the waveforms of output signals from the pixels 211-1 to 211-13 when in the state shown in FIG. 5. The amount of light received by the pixels is proportional to the result of integrating the illuminance distribution of the image shown in FIG. 5 across the entire region of the entrance plane of the pixels. As shown in FIG. 4B, if there is no eccentricity between the exit pupil of the imaging optical system and the projected image of a photoelectric conversion portion, the signal waveforms of the two images are the same. In FIG. 6, the horizontal axis represents X coordinates on the image plane, and the vertical axis represents the signal strength of the pixels. Also, a circle indicates the strength of a first photoelectric conversion portion 211-na (n being the pixel number in the area of interest), that is to say, the image A signal, and a cross indicates the strength of a second photoelectric conversion portion 211-nb (n likewise being the pixel number in the area of interest), that is to say, the image B signal.

As shown in FIG. 5, if the illuminance distribution on the image plane is trapezoidal, signal arrays as shown in FIG. 6 are ideally output. In this case, the strengths of the image A signal and the image B signal are the same, the amount of image shift between two images is 0, and the calculated defocus amount is also 0.

Next, a problem to be solved by the present invention will be described in detail. Focusing on pixel 211-5 in FIG. 5, the image illuminance distribution changes linearly on the entrance plane of the microlens with this pixel. This will be described below with reference to FIGS. 7A and 7B.

FIG. 7A shows the illuminance distribution of the image plane in the vicinity of the pixel 211-5, where the horizontal axis indicates X coordinates on the image plane, and the vertical axis indicates the illuminance of the image. P indicates the X-direction size of the pixels, that is to say, the diameter dimension of the microlens. In the microlens entrance plane of the pixel 211-5, there is a linear illuminance distribution that rises to the right in the range of P as shown in this figure.

FIG. 7B is a cross-sectional diagram for describing the behavior of light beams inside the pixel 211-5. Reference sign 211-5i denotes a microlens, and reference signs 211-5a and 211-5b denote a pair of photoelectric conversion portions. The five lines entering the microlens indicate light beams. Since the exit pupil of the imaging optical system has a predetermined size, the incidence angles of the light beams that enter the microlens 211-5i also have a predetermined range of spread, but FIGS. 7A to 7E focus on only the light beams that pass through the central area of the exit pupil. In other words, the entering light beams are parallel with the optical axis of the microlens. FIG. 7B shows the behavior of five light beams in this luminous flux that are five representative positions defined by regular intervals in the X direction. Since the strengths of these five light beams differ according to the illuminance distribution shown in FIG. 7A, the strengths of the light beams are indicated by their thickness in FIG. 7B.

The role of the microlens 211-5i that the pixels include is to achieve a conjugate relationship between the exit pupil of the imaging optical system and the photoelectric conversion portions, and the following defines the ideal state of the "conjugate relationship". First, light is completely absorbed at the uppermost layer portion (i.e., the surface) of the photoelectric conversion portions and converted into photoelectrons. Also, the amount of separation between the pair of photoelectric conversion portions 211-5a and 211-5b is 0, that is to say, a dead zone does not exist at their boundary, and there is no charge leakage between the two. Meanwhile, the curvature of the microlens 211-5i is designed such that the exit pupil of the imaging optical system and the uppermost face of the photoelectric conversion portions are in an ideal conjugate state.

If the above ideal state is satisfied, the five light beams described above will be focused on the surface of the boundary between the photoelectric conversion portions 211-5a and 211-5b as shown in FIG. 7B. Here, even if all of the light beams are focused into one point in terms of geometrical optics, a spot having a predetermined size, that is to say, a concentric Airy disc is formed due to diffraction in terms of wave optics. Since those light beams are photoelectrically converted at the surface of the photoelectric conversion portions, the amounts of light received by the photoelectric conversion portions 211-5a and 211-5b are the same, and the output signals obtained by the photoelectric conversion are also the same.

However, in an actual image sensor, the above-described ideal conditions are not necessarily realized, and the amounts of light received by the photoelectric conversion portions 211-5a and 211-5b are not the same. The reason for this will be described below with reference to FIGS. 7C to 7E.

Firstly, although it was described that light is completely absorbed at the surface of the photoelectric conversion portions and converted into photoelectrons, photoelectric conversion is performed over a region that is several μm deep from the surface in an actual element. Accordingly, the focal position of the microlens is often set to a location at a predetermined depth from the surface of the photoelectric conversion portions. In this case, as shown in FIG. 7C, the optical power of the microlens is set lower than that in the ideal state, and entering light beams are focused on a position deeper than the surface of the photoelectric conversion portions. Since the intensity of the light beams rises toward the right side in the figure, the amount of light received by the photoelectric conversion portion 211-5a is greater than the amount of light received by the photoelectric conversion portion 211-5b. Accordingly, the photoelectric conversion output, that is to say, the signal strength is also higher with the photoelectric conversion portion 211-5a.

FIG. 7D is a diagram illustrating a phenomenon in which light beams that entered the outer edge portion of the microlens cause unbalance in output from the pair of photoelectric conversion portions. Since the outer edge portion of the microlens is a non-continuous face, the light beams that enter this portion are scattered and diffracted. In other words, the outer edge portion of the microlens can be considered to be a secondary light source that emits diffused light. According to the illuminance distribution shown in FIG. 7A, the left end of the microlens is a secondary light source with a low brightness, and the right end of the microlens is a secondary light source with a high brightness. Here, the photoelectric conversion portion 211-5b is in the vicinity of the light source with a low intensity, and the photoelectric conversion portion 211-5a is in the vicinity of the light source with a high intensity. As a result, the photoelectric conversion portion 211-5a receives a greater amount of light from a secondary light source than the photoelectric conversion portion 211-5b does.

FIG. 7E is a diagram for describing the influence of light beams that entered outside the effective portion of the microlens, and is a plan view showing the pixel 211-5 from above the microlens. The two rectangles shown with dashed lines indicate the surface of the photoelectric conversion portions behind the microlens. The planar shape of the unit pixel is a square, and since the planar shape of the microlens is generally a circle in which the square is inscribed, flat portions that do not have an optical power are located at the four corners of the pixel. The majority of the light beams that enter the flat portions are absorbed by the wiring layer therebelow, but a portion is reflected multiple times by the wiring layer and the non-continuous face in the pixel, and arrives at the photoelectric conversion portions. In other words, the flat portions can also be considered to be a type of secondary light source. According to the illuminance distribution shown in FIG. 7A, the two flat portions on the left side in FIG. 7E are a secondary light source with a low brightness, and the two flat portions on the right side are a secondary light source with a high brightness. For a reason similar to that in FIG. 7D, the photoelectric conversion portion 211-5a receives a greater amount of light from these secondary light sources than the photoelectric conversion portion 211-5b does.

FIGS. 7A to 7E show entering light beams that are parallel with the optical axis as described above, that is to say, light beams that pass through the central portion of the exit pupil of the imaging optical system. FIGS. 8A to 8C are diagrams for describing the behavior of light beams that pass through peripheral portions of the exit pupil.

Light beams that pass through peripheral portions of the exit pupil enter at a predetermined angle relative to the optical axis of the microlens. FIGS. 8A to 8C show the behavior of light beams that have the three incidence angles of 0, +α, and −α. It can be understood from FIGS. 8A, 8B, and 8C that the amounts of light received by the photoelectric conversion portions 211-5a and 211-5b are dependent on the incidence angle of the light beams and the intensity distribution of the light beams in the entrance portion of the microlens. The change in the amount of received light due to the incidence angle of the light beams is canceled out by the extent of contribution of the positive angle and the negative angle. In other words, the extents of contribution of the incidence angles +α and −α shown in FIGS. 8A and 8C are canceled out. It can be understood from this that the difference in the amount of received light between the photoelectric conversion portions 211-5a and 211-5b is due to the illuminance distribution of the object, and is not related to the size of the exit pupil of the imaging optical system, that is to say, the F-number.

As described above, in the area where the illuminance distribution has a predetermined slope, the photoelectric conversion portion located where the illuminance is higher obtains higher output than the other photoelectric conversion portion. This is shown in FIG. 9.

In FIG. 9, the pixels 211-4 and 211-5 are located in an area where the slope of the illuminance distribution is positive, and therefore the output from the photoelectric conversion portion 211-5a is greater than that from the photoelectric conversion portion 211-5b. Also, the pixels 211-9 and 211-10 are located in area where the slope of the illuminance distribution is negative, and therefore the output from the photoelectric conversion portion 211-5b is greater than that from the photoelectric conversion portion 211-5a.

This incongruity in signal strength causes relative image shift between two images. Specifically, as can be understood from FIG. 9, the image A signal array shown by circles is shifted in the negative X axis direction relative to the image B signal array shown by crosses. Accordingly, if focus detection calculation is performed on these two images, the calculated defocus amount will not be 0 even if the in-focus state is achieved in terms of the captured image.

The phenomenon in which a predetermined light amount distribution exists on the predicted imaging plane and causes incongruity between the output of two images due to an optical effect in the pixel has been described above with reference to FIGS. 7A to 9. On the other hand, a similar incongruity phenomenon occurs due to electrical interference, that is to say, electrical crosstalk between adjacent photoelectric conversion portions as well. This will be described below with reference to FIGS. 10 and 11.

Figure 10:
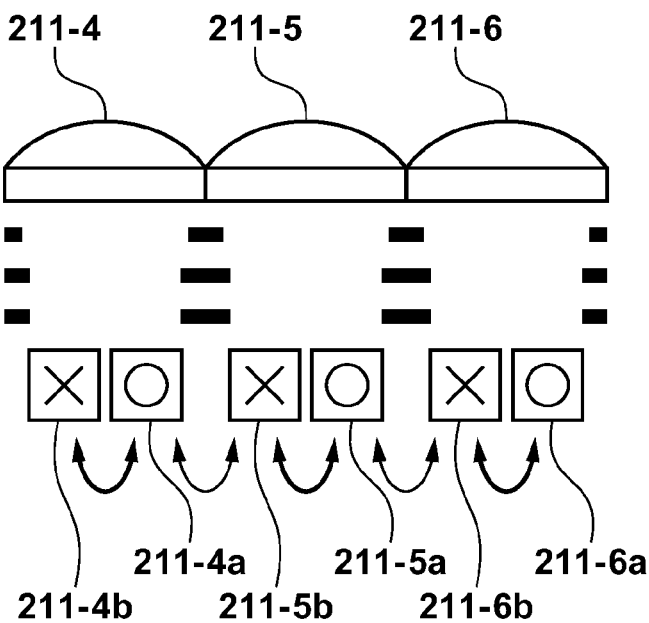
FIG. 10 is a conceptual diagram for describing electrical crosstalk between photoelectric conversion portions.

FIG. 10 is a conceptual diagram for describing electrical crosstalk between photoelectric conversion portions. In FIG. 10, three adjacent pixels 211-4 to 211-6 include a total of six photoelectric conversion portions 211-4a to 211-6b. Crosstalk occurs between the photoelectric conversion portions according to the amount of accumulated charge and barrier capability with respect to charge leakage between the photoelectric conversion portions. Specifically, the smaller the distance between the photoelectric conversion portions, the greater the amount of crosstalk. Also, the higher the accumulated charge, the greater the amount of crosstalk. It should be noted that if the accumulated charge amounts of two adjacent photoelectric conversion portions are the same, the amount of crosstalk from one to the other is substantially the same as the amount of crosstalk in the opposite direction, and therefore the net change in signal strength is small.

The concept of the above-described crosstalk is indicated by the arrows below the photoelectric conversion portions in FIG. 10. When focusing is performed, the accumulated charges of the first photoelectric conversion portion 211-na (n being the pixel number in the area of interest, and the same following hereinafter) and the second photoelectric conversion portion 211-nb in the same pixel are the same. In view of this, the amounts of crosstalk (bold arrows) exchanged between them are the same, and the amount of crosstalk after deduction is apparently 0. However, if the illuminance distribution of the object image has a slope, the amount of crosstalk (thin arrows) between the adjacent photoelectric conversion portions 211-na and 211-(n+1)b in adjacent pixels involves higher leakage in one direction and lower leakage in the opposite direction. Crosstalk at this time therefore makes the change in the output signal apparent.

Figure 11:
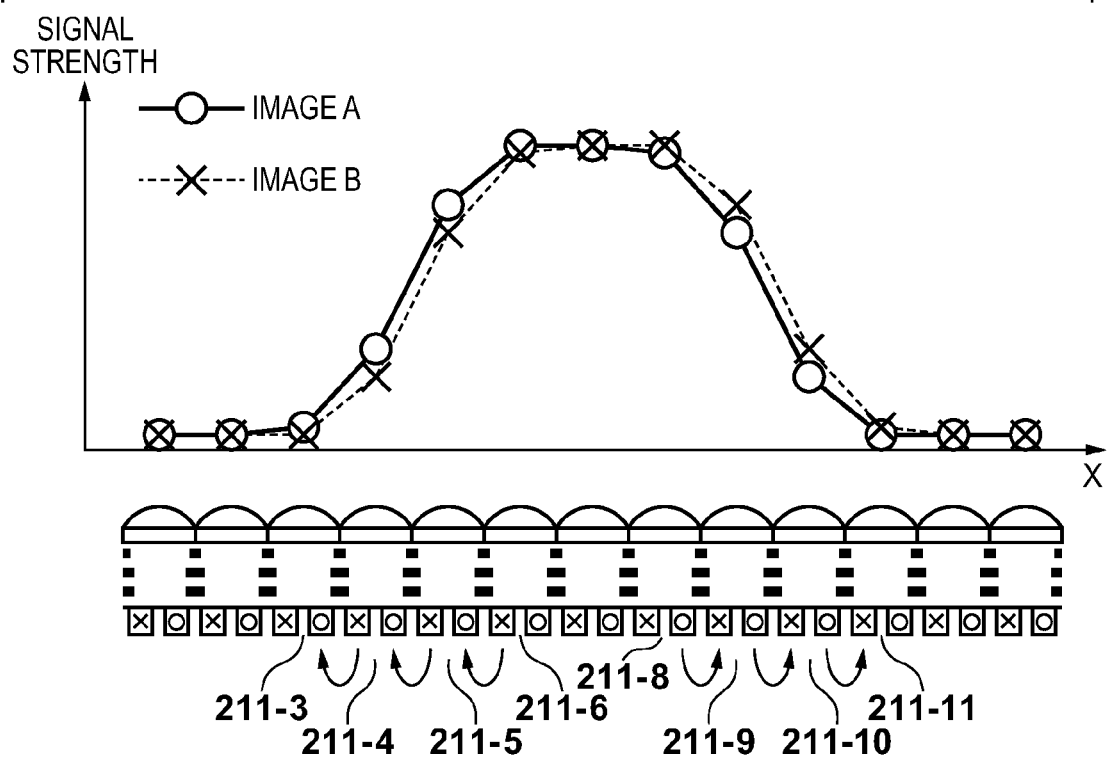
FIG. 11 is a diagram illustrating change in the signal strength of a pixel group due to electrical crosstalk.

Whereas FIG. 6 shows ideal signal waveforms when there is no crosstalk, FIG. 11 shows signal waveforms when the crosstalk described with reference to FIG. 10 occurs. Here, the slope of the illuminance distribution is positive in the area of the pixels 211-3 to 211-6. In view of this, when focus is placed on the pixels 211-3 to 211-5, the accumulated charge amount of the photoelectric conversion portion 211-na for the image A signal in each pixel is lower than the accumulated charge amount of the photoelectric conversion portion 211-(n+1)b for the image B that is adjacent on the right side. Accordingly, the image A signal strength of these three pixels increases by a predetermined amount due to crosstalk. On the other hand, when focus is placed on the pixels 211-4 to 211-6, the accumulated charge amount of the photoelectric conversion portion 211-nb for the image B signal in each pixel is higher than the accumulated charge amount of the photoelectric conversion portion 211-(n−1)a for the image A that is adjacent on the left side. Accordingly, the image B signal strength of these three pixels decreases by a predetermined amount due to crosstalk.

Also, in the pixels 211-8 to 211-11, the slope of the illuminance distribution is negative, and therefore the crosstalk that occurs is the inverse of the crosstalk that occurs with the above-described pixels 211-3 to 211-6.

As described above, the signal strength increases/decreases due to crosstalk in pixel areas where the illuminance distribution has a slope. Accordingly, relative image shift occurs between two images similarly to FIG. 9. Specifically, the image A signal array shown by circles is shifted in the negative X axis direction relative to the image B signal array shown by crosses. Accordingly, if focus detection calculation is performed on these two images, the calculated defocus amount will not be 0 even if the in-focus state is achieved in terms of the captured image.

In other words, with a system in which phase-difference focus detection is performed using imaging pixels, the amount of image shift between two images for focus detection will in principle be 0 in the in-focus state. However, there are cases where a predetermined amount of image shift occurs due to the phenomena described with reference to FIGS. 7A to 11. It has been understood from the research performed by the applicant of the present invention that since these image shift phenomena occur due to mutual effects between the illuminance distribution of the images and the internal structure of the pixels, the amount of change due to characteristics of the imaging optical system is small.

Figure 12:
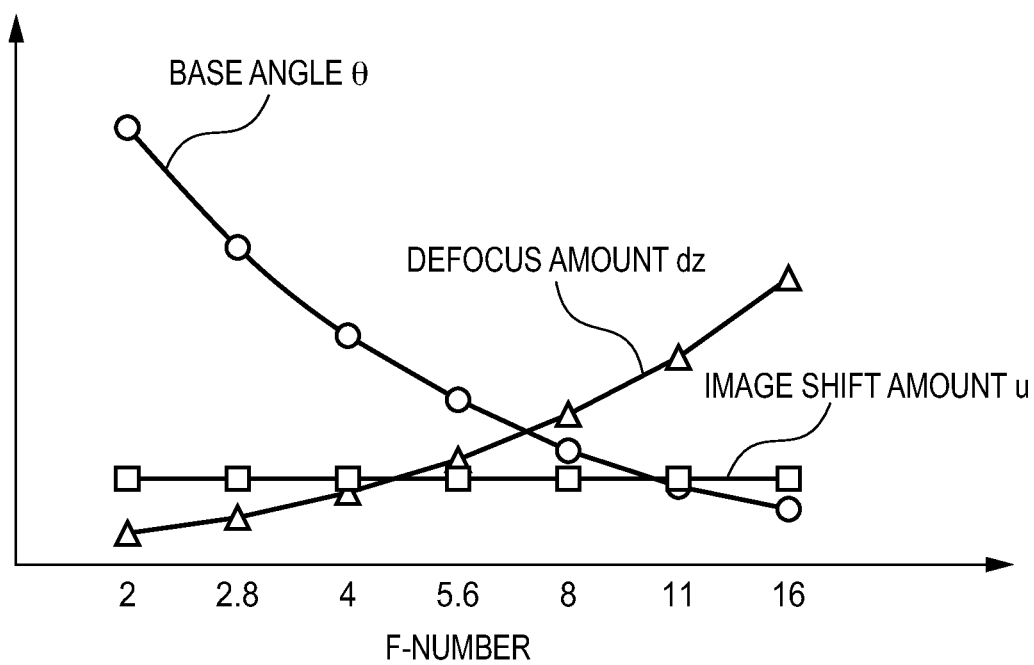
FIG. 12 is a diagram illustrating F-number dependency of focus detection error.

FIG. 12 is a diagram conceptually showing the amount of relative image shift between two images due to the above-described phenomena, and the resulting dependency of focus detection error on the F-number.

The image shift amount u and the defocus amount dz in the phase-difference focus detection system are in the relationship shown in FIGS. 4A to 4C and Expressions (1) and (2).

$$\theta \times dz = u \quad (1)$$

$$dz = u \times (1/\theta) = u \times K1 \quad (2)$$

Here, θ is the base angle of the pair of divided pupils, K1 is a coefficient defined by the inverse of the base angle θ, and the base angle θ decreases as the F-number increases. On the other hand, the image shift amount u due to the phenomena described with reference to FIGS. 7A to 11 has a constant value in FIG. 12 since there is little dependency on the F-number as described above. Accordingly, the focus detection error transformed (converted) into the defocus amount rises rapidly along with an increase in the F-number. Since this characteristic changes slightly due to individual differences (manufacturing error) between image sensors as well, it is sufficient to measure various characteristics using multiple image sensor and store average values thereof in the camera as correction parameters.

Figure 13:
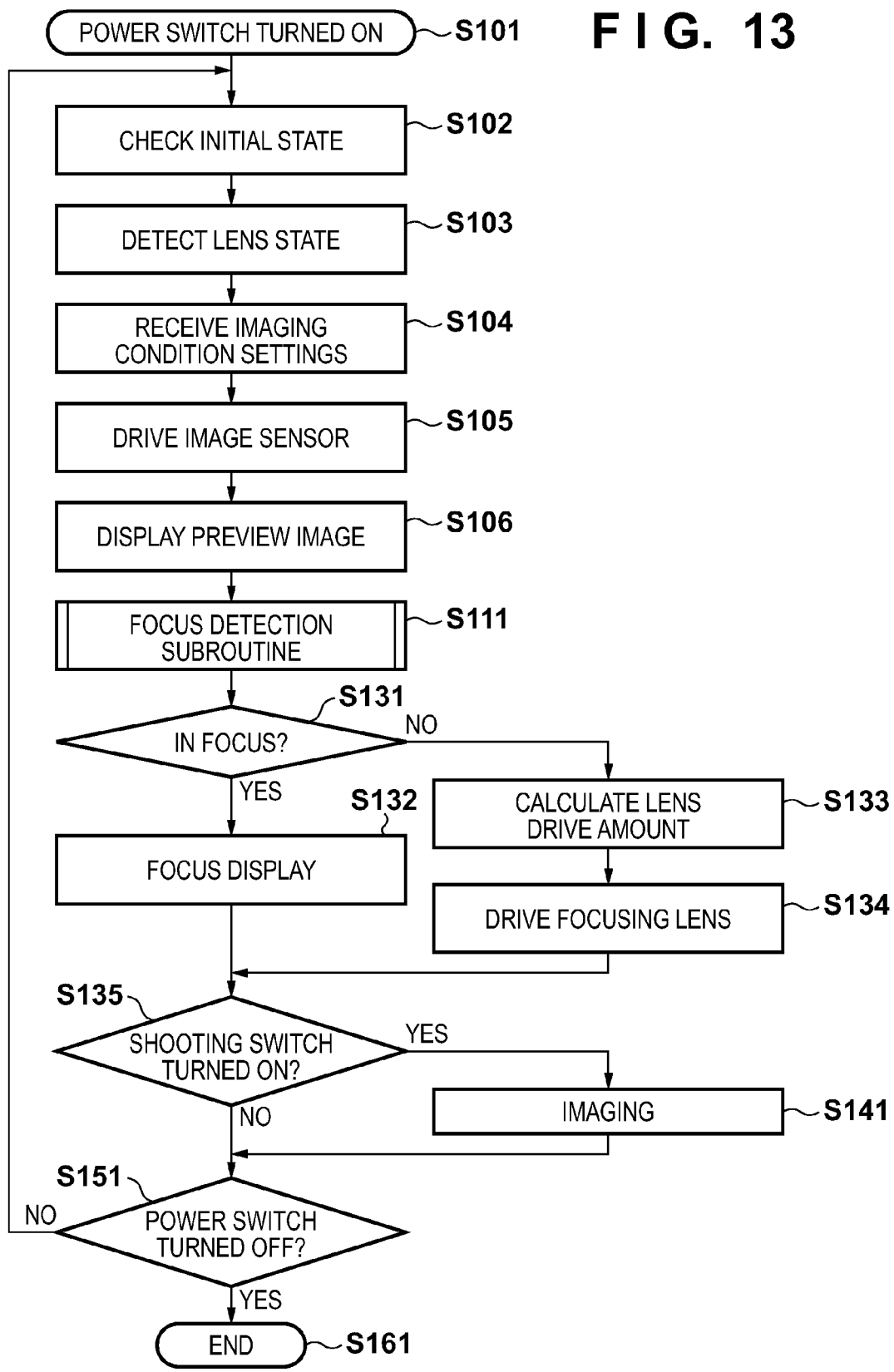
FIG. 13 is a flowchart of main control of the image capture apparatus according to the first embodiment.
Figure 14:
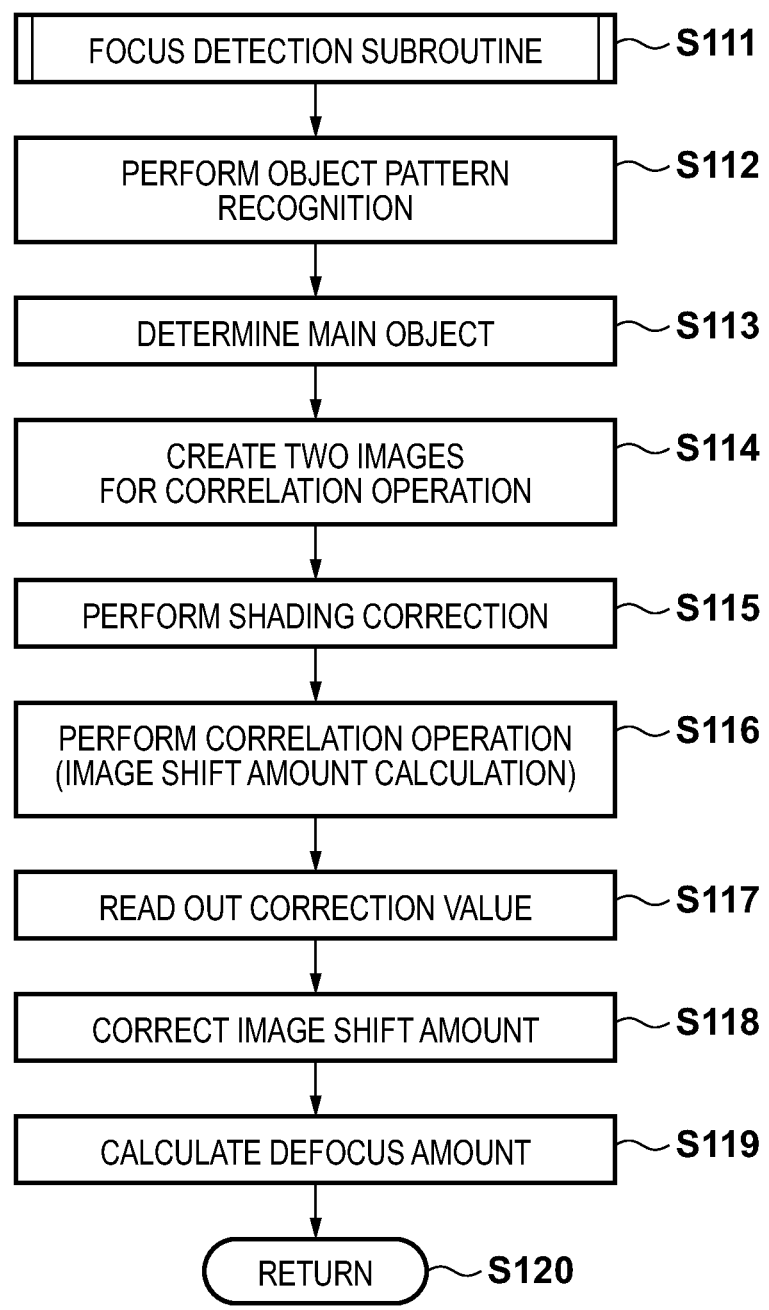
FIG. 14 is a flowchart of a focus detection subroutine according to the first embodiment.

FIGS. 13 and 14 are flowcharts for describing focus adjustment and imaging steps of the camera of the present embodiment. The control flows of FIGS. 13 and 14 will be described below with reference to the previously-described FIGS. 1 to 12.

FIG. 13 shows a main flow of processing performed by the camera of the present embodiment. When the photographer performs an on operation on the power switch of the camera, in step S102, the CPU 121 performs an operation check on the actuators and the image sensor in the camera, initializes the memory content and execution program, and executes an imaging preparation operation.

In step S103, lens state detection is performed. Specifically, the zoom state, the focusing lens state, and the diaphragm state of the imaging optical system are detected, and information regarding the size of the exit pupil, the exit pupil length, the base angle θ, and the like is read out from the ROM.

In step S104, imaging condition setting reception is performed. Specifically, settings regarding the exposure adjustment mode, the focus adjustment mode, the image mode (2D or 3D), the image quality (recording pixel count and compression rate), and the like are set automatically or received through a manual setting operation performed by the photographer.

In step S105, an imaging operation performed by the image sensor is started, and a pixel signal is read out. In step S106, a reduced image for display is created from the pixel signal that was read out, and is displayed on the display 131 provided on the back face of the camera. The photographer then views this preview image and determines the composition, performs a zoom operation, and so on.

In step S111, a later-described focus detection subroutine is executed. In step S131, whether the in-focus state is achieved is determined based on the defocus amount that was calculated in step S111. If the defocus amount is less than or equal to a predetermined value, it is determined that the in-focus state is achieved, and the procedure moves to step S132 in which focus display is performed. On the other hand, if the defocus amount is greater than or equal to the predetermined value, the procedure moves to step S133. In step S133, the defocus amount that was calculated in the focus detection subroutine of step S111 is multiplied by a focus drive coefficient unique to the imaging optical system so as to calculate a focusing lens drive amount. In step S134, the focusing lens is driven.

In step S135, it is determined whether an on operation was performed on the shooting switch; the procedure jumps to step S151 if the on operation has not been performed, and imaging is performed in step S141 if the on operation was performed.

In step S151, it is determined whether the power switch is off; in the case of a negative determination (NO), that is to say, if the on state is being maintained, the procedure returns to step S102, and steps S102 to S151 are executed again. If it is determined in step S151 that the power switch is off, the procedure moves to step S161 in which the execution of the main flow is ended.

FIG. 14 is a flowchart showing the focus detection subroutine. When there is a jump from step S111 of the main flow to step S111 of this subroutine, the procedure moves to step S112 in which an object pattern is recognized based on the preview image, facial image detection is performed, contrast analysis is performed for the entire imaging screen, and so on. In step S113, the main object that is to be focused on is determined based on the recognition result obtained in step S112. For example, if a person's face is recognized as the main object, it is sufficient to apply technology such as that disclosed in Japanese Patent Laid-Open No. 2006-345254 submitted by the applicant of the present application.

In step S114, focus detecting pixels located in the main object area that was determined are extracted, and two images for a correlation operation are created. In step S115, so-called shading correction for reducing a light amount imbalance due to vignetting is applied to the focus detecting signals that were created. In step S116, a correlation operation is performed in order to calculate the image shift amount u between the two images that were subjected to shading correction. To perform this correlation operation, it is sufficient to apply technology such as that disclosed in Japanese Patent Laid-Open No. 2001-305415 submitted by the applicant of the present application.

In step S117, a correction value for correcting error of the two images, which is a problem to be solved by the present invention, is read out from the memory. In the present embodiment, among the error amounts described with reference to FIG. 12, the image shift amount is targeted for correction. Specifically, letting u1 be the image shift amount between two images that was calculated in step S116, u0 be the image shift amount correction value, and u2 be the corrected image shift amount, the correction expression is Expression (3) below.

$$u2 = u1 + u0 \quad (3)$$

Here, the image shift amount correction value u0 can be treated as a constant if there is little dependency of the imaging optical system on the F-number, the exit pupil length of the imaging optical system, the coordinates (image height) of the focus detecting area, and the like. This makes the correction expression simpler, thus suppressing an increase in the calculation time required for correction. An increase in cost can also be avoided since only a small memory capacity is need to store the correction value. In step S118, the correction value u0 that was read out is substituted into Expression (3), and image shift correction is performed.

In step S119, the corrected image shift amount u2 is substituted into the previously-described Expression (2), and the defocus amount dz is calculated. Then, in step S120, the procedure returns to the main routine.

Note that although the image shift amount correction value u0 is considered to be a constant value in the present embodiment, there are cases where, depending on the structure of the image sensor, this value changes according to the F-number of the imaging optical system and other conditions. It should be noted that even in such cases, the value changes with a predetermined tendency, and therefore the correction amount u0 may be defined by and calculated using a polynomial expression such as the following.

$$u0 = U0 + U1 \times F + U2 \times F^2 \quad (4)$$

Here, U0, U1, and U2 are constants stored in the memory, and F is the F-number of the imaging optical system in focus detection.

Also, as another method, correction values u0 may be stored as a lookup table that is referenced using a combination of the F-number of the imaging optical system and the coordinates (image height) of the focus detecting area.

Second Embodiment

In the first embodiment, error correction using a predetermined amount is applied to the image shift amount between two images that is subjected to a phase difference operation. In a second embodiment described below, the image shift amount is transformed (converted) into a defocus amount, and then correction is applied to the defocus amount.

The second embodiment differs from the first embodiment only with respect to the error correction step in the focus detection subroutine, and since the configuration of the image capture apparatus and the main flow for controlling operations of the image capture apparatus are substantially the same as those in the first embodiment, only the differences will be described below.

FIG. 15 is a flowchart of a focus detection subroutine according to the second embodiment. When there is a jump from step S111 of the main flow to step S211 of this subroutine, the procedure moves to step S212 in which an object pattern is recognized based on the preview image, facial image detection is performed, contrast analysis is performed for the entire imaging screen, and so on. In step S213, the main object that is to be focused on is determined based on the recognition result obtained in step S212. In step S214, focus detecting pixels located in the main object area that was determined are extracted, and two images for a correlation operation are created. In step S215, shading correction is applied to the focus detecting signals that were created. In step S216, a correlation operation is performed in order to calculate the image shift amount u between the two images that were subjected to shading correction. Note that the flow up to this point is the same as steps S111 to S116 of the first embodiment.

In step S217, the calculated image shift amount is substituted into the previously-described Expression (2) and transformed in a defocus amount DEF. In step S218, a correction value for correcting error of the two images, which is a problem to be solved by the present invention, is read out from the memory. In the second embodiment, among the error amounts described with reference to FIG. 12, the defocus amount is targeted for correction. Specifically, letting dz1 be the defocus amount that was calculated in step S217, dz0 be the defocus correction value, and dz2 be the corrected defocus amount, the correction expression is Expression (5) below.

$$dz2 = dz1 + dz0 \quad (5)$$

In view of this, in step S219, defocus amount correction is performed using Expression (5), and the corrected defocus amount dz2 is calculated. Then, in step S220, the procedure returns to the main routine.

Next, the method for calculating the correction value dz0 will be described. As shown in FIG. 12, the absolute value of the correction value dz0 increases according to an increase in the F-number of the imaging optical system. In view of this, it is preferable that the correction value dz0 is defined by a polynomial expression such as that shown below.

$$dz0 = D0 + D1 \times F + D2 \times F^2 \quad (6)$$

Here, D0, D1, and D2 are constants stored in the memory, and F is the F-number of the imaging optical system in focus detection.

Also, as another method, correction values dz0 may be stored as a lookup table that is referenced using a combination of the F-number of the imaging optical system and the coordinates (image height) of the focus detecting area.

Third Embodiment

In the first and second embodiments, correction is applied to the result of performing focus adjustment on the main object that is the target of focus adjustment. In a third embodiment described below, focus state information regarding the entire area of a captured image, that is to say, a defocus map, is created.

The third embodiment differs from the first embodiment only with respect to the focus detection subroutine, and since the configuration of the image capture apparatus and the main flow for controlling operations of the image capture apparatus are substantially the same as those in the first embodiment, only the differences will be described below.

Figure 16:
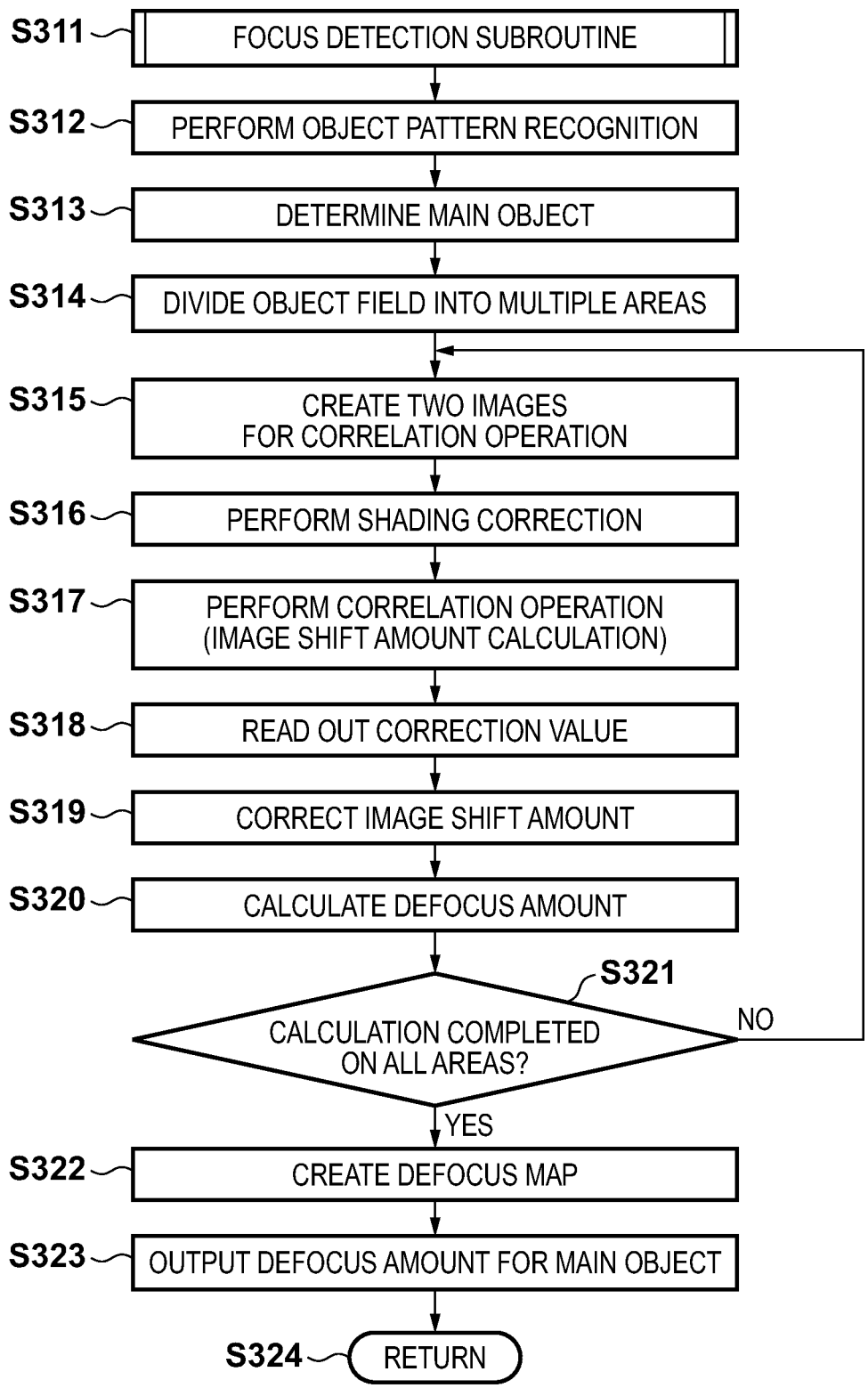
FIG. 16 is a flowchart of a focus detection subroutine according to a third embodiment.

FIG. 16 is a flowchart of a focus detection subroutine according to the third embodiment. When there is a jump from step S111 of the main flow to step S311 of this subroutine, the procedure moves to step S312 in which an object pattern is recognized based on the preview image, facial image detection is performed, contrast analysis is performed for the entire imaging screen, and so on. In step S313, the main object that is to be focused on is determined based on the recognition result obtained in step S312. In step S314, the entire area of the field including the main object and the background is divided into multiple areas based on the result of step S312.

Next, in steps S315 to S321, focus detection and error correction are performed on each of the divided areas in order. First, in step S315, two image signal arrays for focus detection in the first area are created. In step S316, shading correction is applied to the focus detecting signals that were created. In step S317, a correlation operation is performed in order to calculate the image shift amount u between the two images that were subjected to shading correction.

In step S318, a correction value for correcting error of the two images, which is a problem to be solved by the present invention, is read out from the memory. Since the correction value of the present embodiment is similar to that in the first embodiment, a detailed description thereof will not be given. In step S319, image shift correction is performed using the correction value that was read out.

In step S320, the corrected image shift amount is substituted into the previously-described Expression (2), and a defocus amount is calculated. In step S321, it is determined whether defocus amount calculation has been completed on all of the divided areas. If this calculation has not been completed, the procedure returns to step S315, and similar calculation is performed on the next area.

If it is determined in step S321 that defocus amount calculation has been completed on all of the areas, the procedure moves to step S322. In step S322, a so-called defocus map is created by allocating the results of the defocus amount calculation to the respective object areas that were divided in step S314. In step S323, a defocus amount for the area of the main object that was determined in step S313 is output, and the procedure returns to the main routine in step S324. Note that the defocus amount of the main object that was output in step S323 is used in focus detection in step S131 of FIG. 13.

Figure 17A:
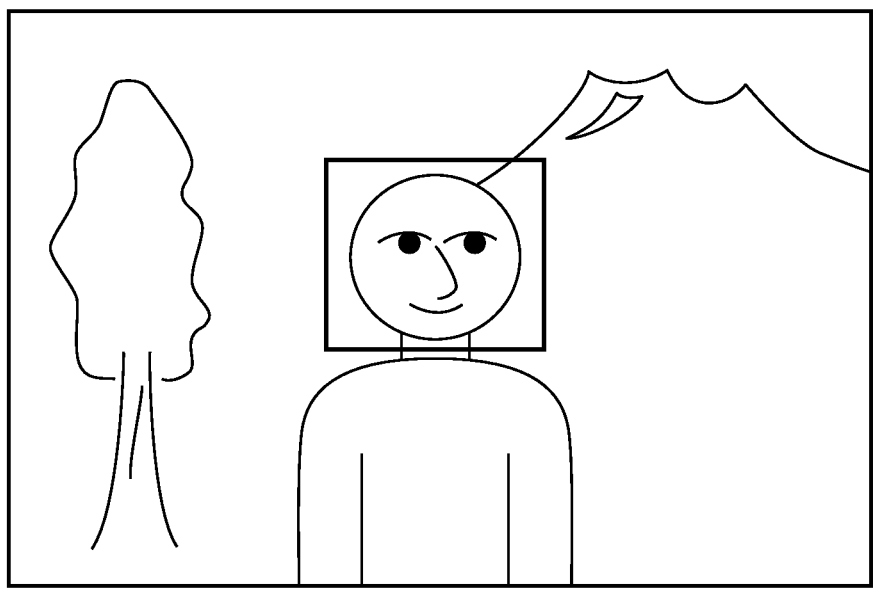
FIGS. 17A and 17B are diagrams illustrating a defocus map according to the third embodiment.
Figure 17B:
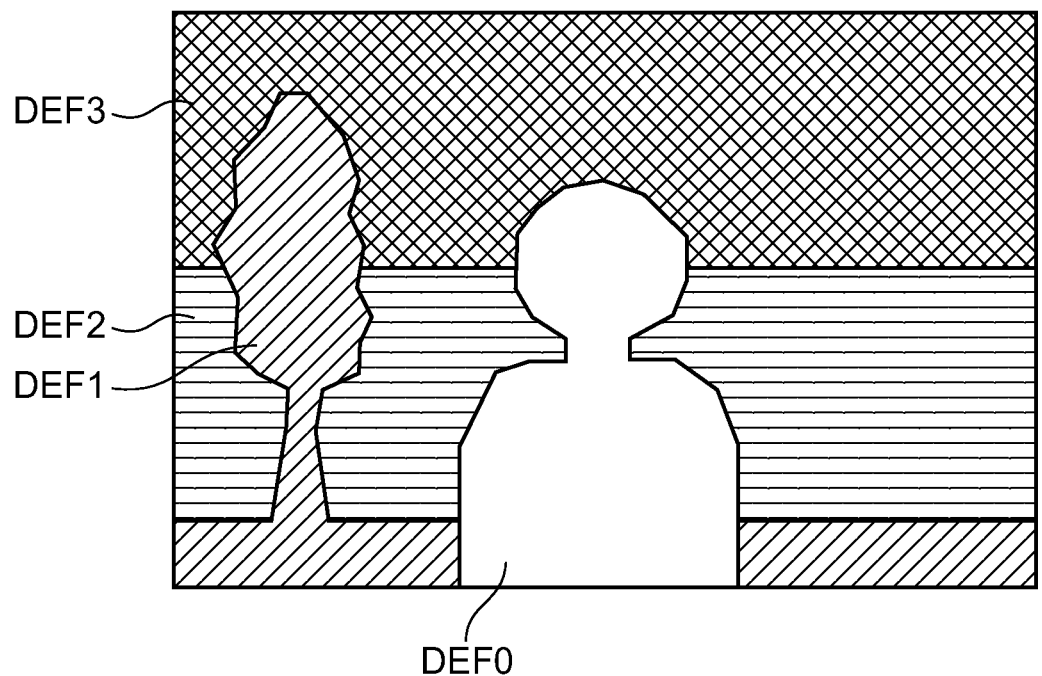

FIGS. 17A and 17B are diagrams for describing the concept of the defocus map created in the third embodiment. FIG. 17A shows an object image acquired by the image sensor. The operations of steps S312 and S313 in FIG. 16 are performed on this object image, and it is determined that a person's face is the main object. Focus adjustment control is then performed according to the main flow of FIG. 13, and focus control with respect to the face is performed.

FIG. 17B shows a defocus map that is created through the focus detection subroutine of the third embodiment. The person's face is focused on through the previously described focus adjustment operation. The defocus amount for the person as a whole, including the face and the person's body, which is at substantially the same distance, becomes substantially 0. This area is denoted by DEF0. The defocus amount in the rearward focus direction increases when moving backward away from the person. In FIG. 17B, the object image is integrated into four areas, and the magnitudes of the defocus amounts of the areas are in the relationship DEF0<DEF1<DEF2<DEF3.

The defocus map can be used as auxiliary information in object recognition, for resolving or emphasizing image defocus, and as parallax information in 3D image generation. Accordingly, it is sufficient that the resolution of the defocus map is set to an appropriate value according to the intended use.

As described above, according to the third embodiment, it is possible to reduce defocus error in various areas when creating a defocus map, thus enabling obtaining precise defocus distribution information.

Fourth Embodiment

Although the photoelectric conversion portions of all of the pixels are divided into two portions in the image sensor used in the above-described embodiments, an image sensor having a different pixel structure or pixel arrangement may be used.

Figure 18:
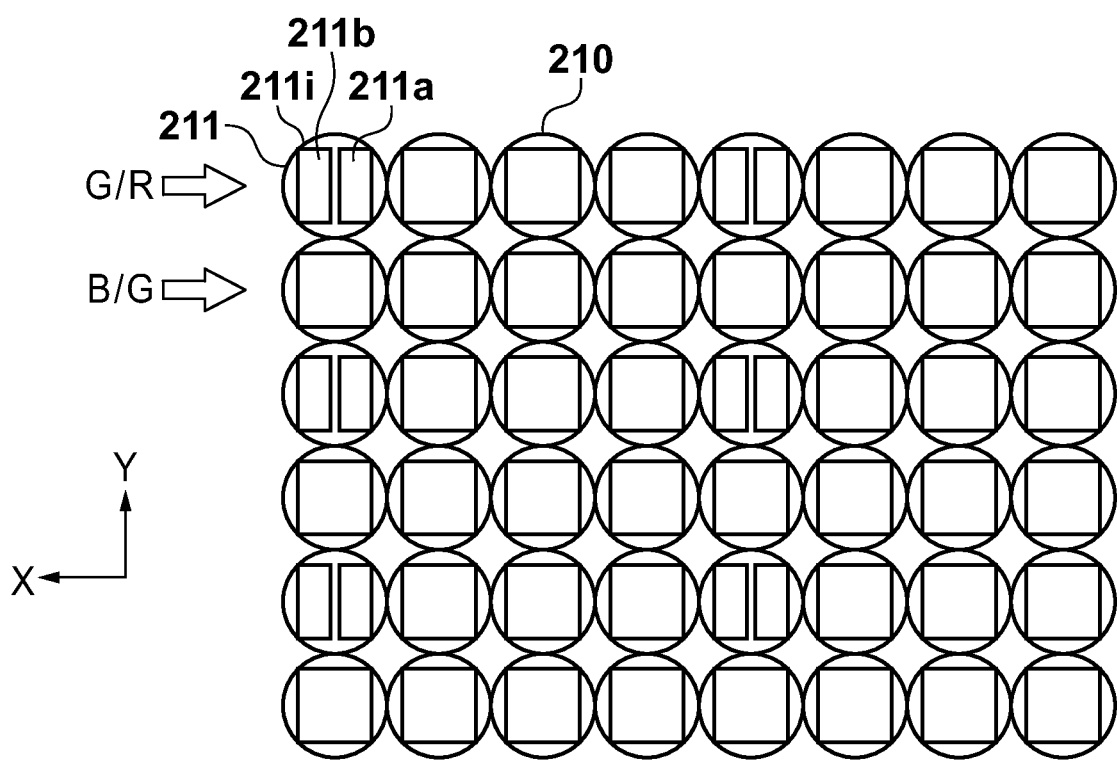
FIG. 18 is a diagram showing a pixel arrangement of an image sensor according to a fourth embodiment of the present invention.

FIG. 18 shows the pixel arrangement of an image sensor according to the fourth embodiment. Reference sign 210 denotes a pixel in which the photoelectric conversion portion is not divided, that is to say, that does not have a pupil division function. Reference sign 211 denotes a pixel in which the photoelectric conversion portion is divided into two portions, the structure of which is substantially the same as that described in the first embodiment, and the pixels 211 are discretely disposed with a predetermined pitch among the pixels 210. Output from the pixels 211 is used in focus detection, and output from all of the pixels is used in image creation.

Note that although the photoelectric conversion portions of the pixels are divided in the X direction in the first to fourth embodiments, the photoelectric conversion portions may be divided in the Y direction or an oblique direction between the X and Y directions. Also, the number of portions the photoelectric conversion portion is divided into is not limited to two portions in one direction, and the present invention can be applied to an image sensor in which the photoelectric conversion portion is divided into multiple portions in both the X direction and the Y direction.

Variation

Although the imaging optical system and the camera body including the image sensor are integrated in the image capture apparatus of the first embodiment, a configuration is possible in which the imaging optical system is detachable from the camera body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-049718, filed Mar. 6, 2012, which is hereby incorporated by reference herein in its entirety.

What is claimed is:

1. An image capture apparatus comprising:
an image sensor having a plurality of pixels that photoelectrically convert an object image formed by an imaging optical system, each of the pixels having one microlens and a plurality of photoelectric conversion portions; and
a controller that calculates information corresponding to a movement amount of a lens of the imaging optical system based on a defocus amount detected based on output from photoelectric conversion portions, and controls movement of the lens of the imaging optical system based on the information, wherein the defocus amount is corrected with correction value which is calculated based on focal length of the microlens.

2. The image capture apparatus according to claim 1, wherein the correction of the defocus amount performed by the controller does not reflect change in an F-number.

3. The image capture apparatus according to claim 1, wherein the controller controls movement of the lens of the imaging optical system based on the defocus amount in accordance with an F-number of the imaging optical system.

4. The image capture apparatus according to claim 1, wherein the controller corrects the defocus amount.

5. The image capture apparatus according to claim 4, wherein the correction of the defocus amount changes in accordance with an F-number of the imaging optical system.

6. The image capture apparatus according to claim 1, further comprising:
an extraction configured to extract a main object that is to be subjected to focus adjustment, from an image formed by the image sensor,
wherein the controller corrects a defocus amount that was detected in association with the main object.

7. The image capture apparatus according to claim 1, further comprising:
a division unit configured to divide an image formed by the image sensor into a plurality of areas,
wherein the controller corrects the detected defocus amount for each of the plurality of divided areas.

8. The image capture apparatus according to claim 1, wherein each of the pixels has a photoelectric conversion portion that has been divided into the plurality of photoelectric conversion portions.

9. The image capture apparatus according to claim 1, further comprising a focus detection unit configured to detect the defocus amount based on an image shift amount detected with a phase difference detection method using focus detection signal arrays of two images obtained by the photoelectric conversion portions.

10. An image capture apparatus comprising:
an image sensor having a plurality of pixels that photoelectrically convert an object image formed by an imaging optical system, each of the pixels having one microlens and a plurality of photoelectric conversion portions; and
a controller that calculates information corresponding to a movement amount of a lens of the imaging optical system based on a defocus amount detected based on output from photoelectric conversion portions, and controls movement of the lens of the imaging optical system based on the information, wherein the defocus amount is corrected with correction value which is calculated based on shape of the microlens.

11. The image capture apparatus according to claim 10, wherein the correction of the defocus amount performed by the controller does not reflect change in an F-number.

12. The image capture apparatus according to claim 10, wherein the controller controls movement of the lens of the imaging optical system based on the defocus amount in accordance with an F-number of the imaging optical system.

13. The image capture apparatus according to claim 10, wherein the controller corrects the defocus amount.

14. The image capture apparatus according to claim 13, wherein the correction of the defocus amount changes in accordance with an F-number of the imaging optical system.

15. The image capture apparatus according to claim 10, further comprising:
   an extraction configured to extract a main object that is to be subjected to focus adjustment, from an image formed by the image sensor,
   wherein the controller corrects a defocus amount that was detected in association with the main object.

16. The image capture apparatus according to claim 10, further comprising:
   a division unit configured to divide an image formed by the image sensor into a plurality of areas,
   wherein the controller corrects the detected defocus amount for each of the plurality of divided areas.

17. The image capture apparatus according to claim 10, wherein each of the pixels has a photoelectric conversion portion that has been divided into the plurality of photoelectric conversion portions.

18. The image capture apparatus according to claim 10, further comprising a focus detection unit configured to detect the defocus amount based on an image shift amount detected with a phase difference detection method using focus detection signal arrays of two images obtained by the photoelectric conversion portions.

* * * * *